(12) United States Patent
Sakuyama

(10) Patent No.: US 8,559,735 B2
(45) Date of Patent: Oct. 15, 2013

(54) INFORMATION PROCESSING APPARATUS FOR EXTRACTING CODES CORRESPONDING TO AN IMAGE AREA

(75) Inventor: Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 833 days.

(21) Appl. No.: 12/453,581

(22) Filed: May 15, 2009

(65) Prior Publication Data

US 2009/0285498 A1    Nov. 19, 2009

(30) Foreign Application Priority Data

May 15, 2008 (JP) ................................ 2008-128850

(51) Int. Cl.
*G06K 9/36* (2006.01)
*G06K 9/46* (2006.01)

(52) U.S. Cl.
USPC ............................ 382/233; 382/232; 382/248

(58) Field of Classification Search
USPC .................. 382/232–253; 348/394.1–420.1;
375/240.01–240.24;
358/426.01–426.14
See application file for complete search history.

(56) References Cited

U.S. PATENT DOCUMENTS

| | | | |
|---|---|---|---|
| 7,013,049 B2 | 3/2006 | Sakuyama | |
| 7,031,541 B2 | 4/2006 | Sakuyama | |
| 7,333,664 B2 | 2/2008 | Sakuyama et al. | |
| 7,336,852 B2 | 2/2008 | Nomizu et al. | |
| 7,352,907 B2 | 4/2008 | Sakuyama et al. | |
| 7,352,908 B2 * | 4/2008 | Kodama | 382/251 |
| 7,373,007 B2 | 5/2008 | Sakuyama et al. | |
| 7,394,470 B2 | 7/2008 | Nishimura et al. | |
| 7,409,095 B2 | 8/2008 | Sakuyama et al. | |
| 7,450,768 B2 | 11/2008 | Sakuyama et al. | |
| 7,450,773 B2 | 11/2008 | Nomizu et al. | |
| 2002/0039440 A1 | 4/2002 | Sakuyama | |
| 2002/0159644 A1 | 10/2002 | Sakuyama | |
| 2003/0002742 A1* | 1/2003 | Sano et al. | 382/239 |
| 2003/0031370 A1* | 2/2003 | Andrew | 382/233 |
| 2003/0198394 A1* | 10/2003 | Fukuhara et al. | 382/240 |
| 2004/0013310 A1* | 1/2004 | Suino et al. | 382/240 |
| 2004/0126020 A1 | 7/2004 | Sakuyama et al. | |
| 2004/0126029 A1 | 7/2004 | Sakuyama et al. | |
| 2004/0131264 A1 | 7/2004 | Sakuyama et al. | |

(Continued)

FOREIGN PATENT DOCUMENTS

JP    11-205786    7/1999
JP    2002-149153    5/2002

(Continued)

OTHER PUBLICATIONS

Office Action for corresponding Japanese Application No. 2008-128850 dated Feb. 28, 2012.

*Primary Examiner* — Li Liu
(74) *Attorney, Agent, or Firm* — Harness, Dickey & Pierce

(57) ABSTRACT

An information processing apparatus is disclosed, including: a receiver, an extractor, and a selector. The receiver receives a portion of an image as an image area. The extractor define one or more divisions corresponding to the image area received by the receiver as a first division group, extracts first codes of the first division group, and extracts second codes of second divisions of the image area influencing decoding of the first codes, if extraction of the second codes is not suppressed. The selector suppresses extraction of the second codes in response to a selection indicating not to extract the second codes.

8 Claims, 21 Drawing Sheets

(56) References Cited

U.S. PATENT DOCUMENTS

| | | |
|---|---|---|
| 2004/0151387 A1 | 8/2004 | Sakuyama et al. |
| 2004/0201593 A1 | 10/2004 | Nishimura et al. |
| 2004/0202372 A1 | 10/2004 | Sakuyama et al. |
| 2004/0212843 A1 | 10/2004 | Kodama et al. |
| 2004/0217887 A1 | 11/2004 | Nomizu et al. |
| 2004/0218817 A1 | 11/2004 | Kodama et al. |
| 2004/0228534 A1 | 11/2004 | Sakuyama et al. |
| 2004/0252897 A1 | 12/2004 | Hara et al. |
| 2005/0015247 A1 | 1/2005 | Sakuyama et al. |
| 2005/0031215 A1 | 2/2005 | Nomizu et al. |
| 2005/0111740 A1 | 5/2005 | Sakuyama |
| 2006/0012495 A1 * | 1/2006 | Fukuhara et al. ............... 341/50 |
| 2006/0120610 A1 * | 6/2006 | Kong et al. ................... 382/232 |
| 2006/0133682 A1 | 6/2006 | Tu et al. |
| 2006/0133684 A1 | 6/2006 | Srinivasan et al. |
| 2006/0152391 A1 | 7/2006 | Sakuyama |
| 2006/0269151 A1 | 11/2006 | Sakuyama |
| 2007/0189622 A1 | 8/2007 | Sakuyama |

FOREIGN PATENT DOCUMENTS

| | | |
|---|---|---|
| JP | 2003-023630 | 1/2003 |
| JP | 2004-056213 | 2/2004 |
| JP | 2006-197573 | 7/2006 |

* cited by examiner

RELATED ART

INFORMATION PROCESSING APPARATUS FOR EXTRACTING CODES CORRESPONDING TO AN IMAGE AREA

BACKGROUND OF THE INVENTION

1. Field of the Invention

The present invention is related to an information processing apparatus, an information processing method, and a computer-readable encoding medium recorded with a computer program thereof.

2. Description of the Related Art

Recently, wavelet transformation has been increasingly used for image compression/depression as a frequency transformation taking the place of a DCT (Discrete Cosine Transform). A typical example of the wavelet transformation is an image compression/decompression method of JPEG 2000 which is now the successor of JPEG and became the international standard in 2001.

Codes (hereinafter, also called JPEG 2000 code) encoded by a JPEG 2000 method can be accessed by packet units or simpler tile part units. This means that it is possible to extract necessary codes from original codes and generate new codes. Also, this means that it is possible to decode codes alone partially acquired from the original codes if necessary.

For example, in a case of displaying a large image residing in a server at a side of a client, it is possible to receive and decode codes for a desired resolution only, codes for a desired portion only to view, or codes for a desired component only to view, from the server.

As described above, a protocol for receiving necessary codes from JPEG 2000 codes residing in the server is called JPIP (JPEG 2000 Interactive Protocol). The protocol for partially accessing a hierarchical image can be seen in a FlashPix™ which depicts an image in a multi-resolution and in an IIP (Internet Imaging Protocol) which is a protocol to access the FlashPix™.

For example, Japanese Laid-open Patent Application No. 11-205786 discloses a technology that enables selecting to indicate at least one of a resolution, a display range, and a frame rate and downloading an image corresponding to one frame of a motion picture by a unit of the pixel group element piece, from a server storing an image.

Also, Japanese Laid-open Patent Application No. 2003-23630 discloses a technology relating to a cache model and a like in the JPIP.

In a case of using the above-described JPIP, it is suggested to instruct a resolution desired to draw an image and a window size to actually draw on a screen, from a client to a server. When the server receives this instruction from the client, the server sends a packet of a precinct sufficient to conduct a frequency inverse transformation for an area of the instructed resolution, or further simply sends codes of tiles (or tile parts) covering the area.

The wavelet coefficient has a correspondence with a location of an original image, and the precinct indicates a position. In a case of inversely transforming the wavelet coefficient, a coefficient inside the precinct and a coefficient outside the precinct are not independent of each other, and an accurate wavelet inverse transformation cannot be conducted by using only the coefficient inside the precinct.

Accordingly, in a case of inversely transforming the wavelet coefficient inside the precinct received at a side of the client, there is a case in which the coefficient outside the received precinct is also required. Thus, there is a case in which a wavelet inverse transformation cannot be adequately conducted by using the received precinct only.

SUMMARY OF THE INVENTION

The present invention solves or reduces one or more of the above problems.

In one aspect of this disclosure, there is provided an information processing apparatus which divides an image into rectangular areas, conducts a frequency transformation with respect to the divided rectangular areas of the image, further divides the rectangular areas, to which the frequency transformation is conducted, into divisions being rectangular, and stores codes to which an entropy encoding is conducted based on coefficients of the divisions being rectangular, the information processing apparatus including: a receiving part configured to receive a predetermined image area in the image; an extracting part configured to define one or more divisions corresponding to the predetermined image area received by the receiving part as a first division group, and to extract codes of the first division group; and a selecting part configured to select whether or not to extract codes of divisions influencing decoding of codes of the first division group with the codes to be extracted by the extracting part.

In another aspect of this disclosure, there is provided an information processing apparatus which divides an image into rectangular areas, conducts a filter operation with respect to pixels of the divided rectangular areas by using pixels of rectangular areas adjacent to the divided rectangular areas, and stores codes resulted from conducting a frequency transformation and encoding with respect to the pixels to which the filter operation is conducted, the information processing apparatus including: a receiving part configured to receive a predetermined image area in the image; an extracting part configured to define one or more divisions corresponding to the predetermined image area received by the receiving part as a first rectangular area group, and to extract codes of the first rectangular area group; and a selecting part configured to select whether or not to extract codes of rectangular areas influencing decoding of codes of the first rectangular area group with the codes to be extracted by the extracting part.

In other aspects of this disclosure, there may be provided an information processing method conducted in the information processing apparatus and a computer-readable encoding medium recorded with a computer program for causing a computer to conduct the information processing method.

BRIEF DESCRIPTION OF THE DRAWINGS

In the following, embodiments of the present invention will be described with reference to the accompanying drawings.

DESCRIPTION OF THE PREFERRED EMBODIMENT

In the following, an embodiment of the present invention will be described with reference to the accompanying drawings.

First Embodiment

<Coding Process of JPEG 2000>

Figure 1:
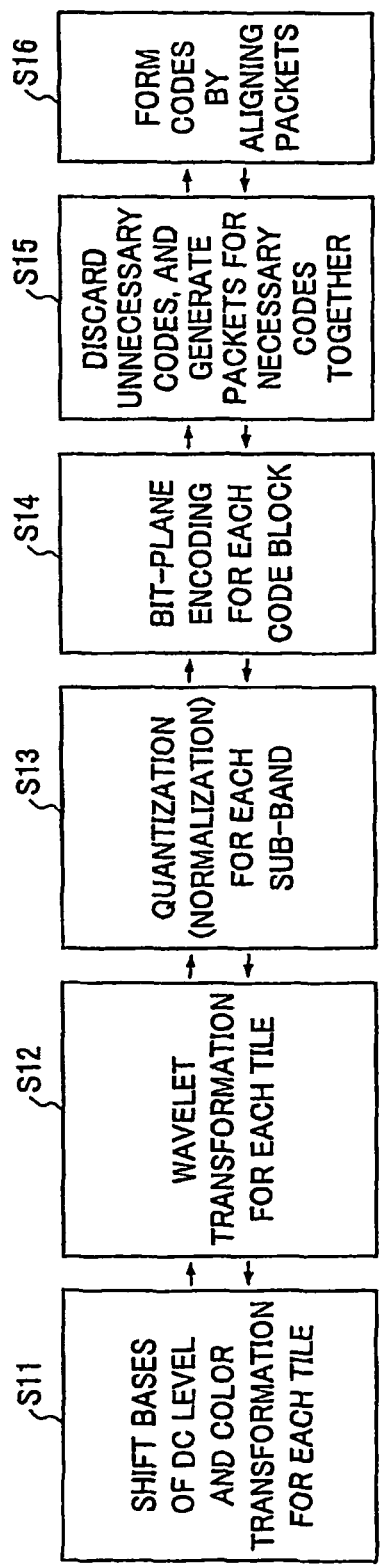
FIG. 1 is a schematic flowchart for explaining a compression and decompression process of JPEG 2000.

Before explaining an information processing apparatus according to a first embodiment, a coding process of JPEG 2000, which depends on the coding process of the first embodiment, will be described. FIG. 1 is a schematic flowchart for explaining the coding process of JPEG 2000.

First, an image is divided into rectangular tiles (the number of divisions ≥1). Next, for example, in a case of compressing a color image being formed by three components of RGB (Red, Green, and Blue), after a DC level shift, a component transformation (color transformation) into luminance and color difference components is conducted for each of tiles (S11).

Next, the wavelet transformation is conducted (S12), a quantization is conducted if necessary (S13), and an entropy coding is conducted in which a bit plane is used as a unit (S14). After that, unnecessary codes are discarded, and packets are generated together for necessary codes (S15) Then, codes are formed by aligning packets (S16).

Also, when an expansion process is conducted, for the wavelet coefficient for each of components acquired through an inverse quantization conducted after an entropy decoding is conducted by the bit plane unit, the wavelet inverse transformation is performed. After that, an inverse color transformation is conducted, so as to return to pixel values of RGB. In the following, each of processes will be described.

First, a DC level shift will be described. A transformation expression and an inverse transformation expression of the DC level of JPEG 2000 are described as follows:

$$I(x,y) \leftarrow I(x,y) - 2^{Ssiz(i)} \quad \text{direct transformation} \tag{1}$$

$$I(x,y) \leftarrow I(x,y) + 2^{Ssiz(i)} \quad \text{inverse transformation} \tag{2}$$

Ssiz(i) indicates a value resulted from deducting one from a bit depth of each component I (I=0, 1, 2) of the original image. Also, $2^{Ssiz(i)}$ denotes Ssiz(i) to the power of two, and I(x, y) denotes an initial signal value (pixel value) at a coordinate (x, y).

In this DC level shift, in a case of a positive number such as a RGB signal value, a level shift is conducted so as to deduct a half dynamic range of a signal from each signal value in the direct transformation, and the level shift is conducted so as to add the half dynamic range of the signal of the each signal value in the inverse transformation. However, this level shift is not applied to signed integers such as Cb and Cr signals of YCbCr signals.

Next, a component transformation will be described. In JPEG 2000, RCT (Reversible multiple Component Transformation) and ICT (Irreversible multiple Component Transformation) are defined as the component transformations.

A direct transformation and an inverse transformation of the RCT are expressed by the following expressions:
(Direct Transformation)

$$Y0(x,y) = \text{floor}((I0(x,y) + 2 \times (I1(x,y) + I2(x,y))/4) \tag{3}$$

$$Y1(x,y) = I2(x,y) - I1(x,y) \tag{4}$$

$$Y2(x,y) = I0(x,y) - I1(x,y) \tag{5}$$

(Inverse Transformation)

$$I1(x,y) = Y0(x,y) - \text{floor}((Y2(x,y) + Y1(x,y))/4) \tag{6}$$

$$I0(x,y) = Y2(x,y) + I1(x,y) \tag{7}$$

$$I2(x,y) = Y1(x,y) + I1(x,y) \tag{8}$$

I in the above expressions denotes an initial signal, Y denotes a signal after transformation, and numerals 0 through 2 following letters I or Y are suffixes. In a case of the RGB signal, I0=R, I1=G, and I2=B for an I signal, and Y0=Y, Y1=Cb, and Y2=Cr for a Y signal. In addition, floor (X) is a function for substituting a real number X with an integer which does not exceed X and is closest to X.

A direct transformation and an inverse transformation of the ICT are expressed by the following expressions:
(Direct Transformation)

$$Y0(x,y) = 0.299 \times I0(x,y) + 0.587 \times I1(x,y) + 0.144 \times I2(x,y) \tag{9}$$

$$Y1(x,y) = -0.16875 \times I0(x,y) - 0.33126 \times I1(x,y) + 0.5 \times I2(x,y) \tag{10}$$

$$Y2(x,y) = 0.5 \times I0(x,y) - 0.41869 \times I1(x,y) - 0.08131 \times I2(x,y) \tag{11}$$

(Inverse Transformation)

$$I0(x,y) = Y0(x,y) + 1.402 \times Y2(x,y) \tag{12}$$

$$I1(x,y) = Y0(x,y) - 0.34413 \times Y1(x,y) - 0.71414 \times Y2(x,y) \tag{13}$$

$$I2(x,y) = Y0(x,y) + 1.772 \times Y1(x,y) \tag{14}$$

I in the above expressions denotes an initial signal, Y denotes a signal after transformation, and numerals 0 through 2 following letters I or Y are suffixes. In a case of the RGB signal, I0=R, I1=G, and I2=B for an I signal, and Y0=Y, Y1=Cb, and Y2=Cr for a Y signal.

Next, the wavelet transformation will be described. The above-described component (called tile component) after being transformed is divided into four sub-bands called LL, HL, LH, and HH, by the wavelet transformation. Then, the wavelet transformation (decomposition) is recursively repeated for LL sub-bands. As a result, one LL sub-band and a plurality of an HL sub-band, an LH sub-band, and an HH sub-band are generated.

A 5×3 wavelet transformation and a 9×7 wavelet transformation used by the JPEG 2000 will be described. In the JPEG 2000, either the 5×3 wavelet transformation or the 9×7 wavelet transformation is selected to use.

The 5×3 wavelet transformation is a transformation in which an output (low pass coefficient) of one low pass filter is acquired by using 5 pixels and an output (high pass coefficient) of one high pass filter is acquired by using 3 pixels. Similarly, the 9×7 wavelet transformation is a transformation in which an output (low pass coefficient) of one low pass filter is acquired by using 9 pixels, and an output (high pass coefficient) of one high pass filter is acquired by using 7 pixels. A main difference is a range of the filters. However, in the same manner, the low pass filter is arranged at a center of an even-numbered location, and the high pass filter is arranged at a center of an odd-numbered location.

The 5×3 wavelet transformation is expressed by the following transformation expressions:
(Direct Transformation)

$$[\text{step1}]\ C(2i+1)=P(2i+1)-\text{floor}((P(2i)+P(2i+2))/2) \quad (15)$$

$$[\text{step2}]\ C(2i)=P(2i)+\text{floor}(((C(2i-1)+C(2i+1)+2)/4) \quad (16)$$

(Inverse Transformation)

$$[\text{step3}]\ P(2i)=C(2i)-\text{floor}((C(2i-1)+C(2i+1)+2)/4) \quad (17)$$

$$[\text{step4}]\ P(2i+1)=C(2i+1)+\text{floor}((P(2i)+P(2i+2))/2) \quad (18)$$

The 9×7 wavelet transformation is expressed by the following transformation expressions:
(Direct Transformation)

$$[\text{step1}]\ C(2n+1)=P(2n+1)+\alpha \times (P(2n)+P(2n+2)) \quad (19)$$

$$[\text{step2}]\ C(2n)=P(2n)+\beta \times (C(2n-1)+C(2n+1)) \quad (20)$$

$$[\text{step3}]\ C(2n+1)=C(2n+1)+\gamma \times (C(2n)+C(2n+2)) \quad (21)$$

$$[\text{step4}]\ C(2n)=C(2n)+\delta \times (C(2n-1)+C(2n+1)) \quad (22)$$

$$[\text{step5}]\ C(2n+1)=K \times C(2n+1) \quad (23)$$

$$[\text{step6}]\ C(2n)=(1/K) \times C(2n) \quad (24)$$

(Inverse Transformation)

$$[\text{step 1}]\ P(2n)=K \times C(2n) \quad (25)$$

$$[\text{step 2}]\ P(2n+1)=(1/K) \times C(2n+1) \quad (26)$$

$$[\text{step 3}]\ P(2n)=X(2n)-\delta \times (P(2n-1)+P(2n+1)) \quad (27)$$

$$[\text{step 4}]\ P(2n+1)=P(2n+1)-\gamma \times (P(2n)+P(2n+2)) \quad (28)$$

$$[\text{step 5}]\ P(2n)=P(2n)-\beta \times (P(2n-1)+P(2n+2)) \quad (29)$$

$$[\text{step 6}]\ P(2n)=P(2n+1)-\alpha \times (P(2n)+P(2n+2)) \quad (30),$$

where:
$\alpha=-1.586134342059924$,
$\beta=-0.052980118572961$,
$\gamma=0.882911075530934$,
$\delta=0.443506852043971$, and
$K=1.230174104914001$.

Next, steps of the wavelet transformation, and definitions of a decomposition level, a resolution level, and a sub-band will be described.

As an example, with respect to (a luminous component of) a 16×16 image, a wavelet transformation which is called a 5×3 transformation is performed in two-dimensions (a vertical direction and a horizontal direction).

Figure 2:
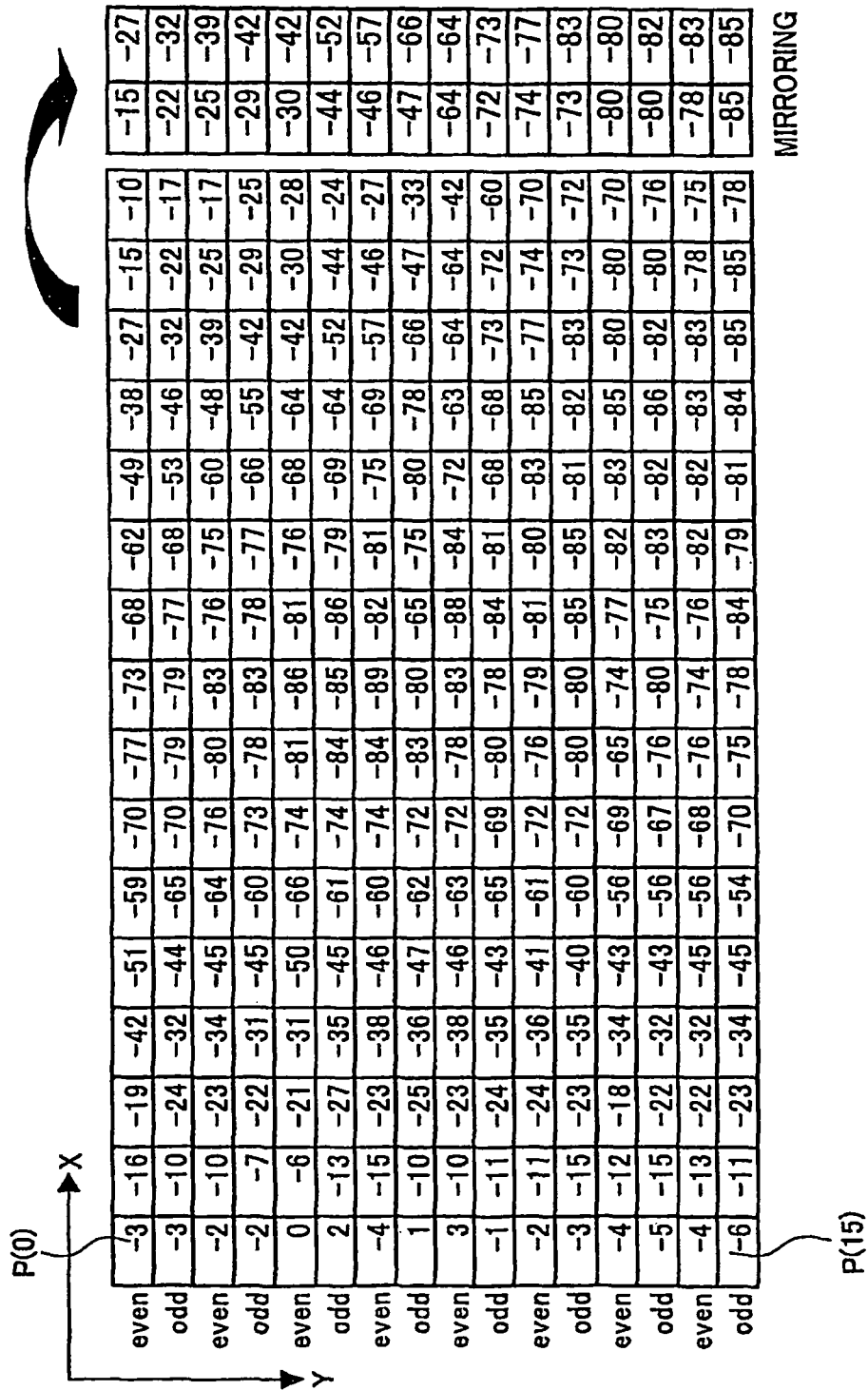
FIG. 2 is a diagram illustrating examples of an original image and a coordinate system.

FIG. 2 is a diagram illustrating a 16×16 initial image and a coordinate system. As illustrated in FIG. 2, xy coordinates are formed, and a value of a pixel in which a y-coordinate indicates y is represented by $P(y)$ ($0 \le y \le 15$) for a certain x. In the JPEG 2000, first, in the vertical direction (Y coordinate direction), the high pass filter is conducted with a focus on pixels located at the odd number ($y=2i+1$) of the y-coordinate and a coefficient $C(2i+1)$ is acquired. Next, the low pass filter is conducted with a focus on pixels located at the even number ($y=2i$) of the y-coordinate and a coefficient $C(2i)$ is acquired. In this process, the high pass filter and the low pass filter are conducted for all x values.

The high pass filter is calculated by the expression 15 in the above step 1, and the low pass filter is calculated by the expression 16 in the above step 2. At edges of an image, there are no adjacent pixels with respect to a pixel which is focused on. In this case, pixel values are compensated by applying a method which is called mirroring. Mirroring is a well-known technique in which vertical pixels are supposed outside the edges of the image, and as each pixel of the edges of the image is set as an axis of symmetry, pixels inside each edge are symmetrically copied to pixels outside the edge.

H denotes the coefficient acquired by the high pass filter and L denotes the coefficient acquired by the low pass filter. By transforming in the vertical direction, the image illustrated in FIG. 2 is transformed into an L coefficient sequence and an H coefficient sequence.

Subsequently, with respect to the L and H coefficient sequences after transforming in the vertical direction, in the horizontal direction, the high pass filter is conducted with a focus on pixels located at the even number ($x=2i$) of the x-coordinate, and then, the low pass filter is conducted with a focus on pixels located at the odd number ($x=2i+1$) of the x-coordinate. In this case, $P(2i)$ and a like in the step 1 and the step 2 are read as coefficient values.

LL denotes a coefficient acquired by conducting the low pass filter with a focus on the L coefficient, HL denotes a coefficient acquired by conducting the high pass filter with a focus on the L coefficient, LH denotes a coefficient acquired by conducting the low pass filter with a focus on the H coefficient, and HH denotes a coefficient acquired by conducting the high pass filter with a focus on the H coefficient.

One wavelet transformation is conducted respectively in the vertical direction and in the horizontal direction (one decomposition).

A sub-band is formed by collecting LL coefficients (which is called a deinterleave, and arranging in a state after filtering in the horizontal direction is called an interleave).

A further wavelet transformation is conducted by recognizing a LL sub-band as an original image. A prefix of the coefficient indicates the number of the wavelet transformation conducted to acquire the coefficient respectively in the vertical and horizontal directions, which is called a decomposition.

Figure 3:
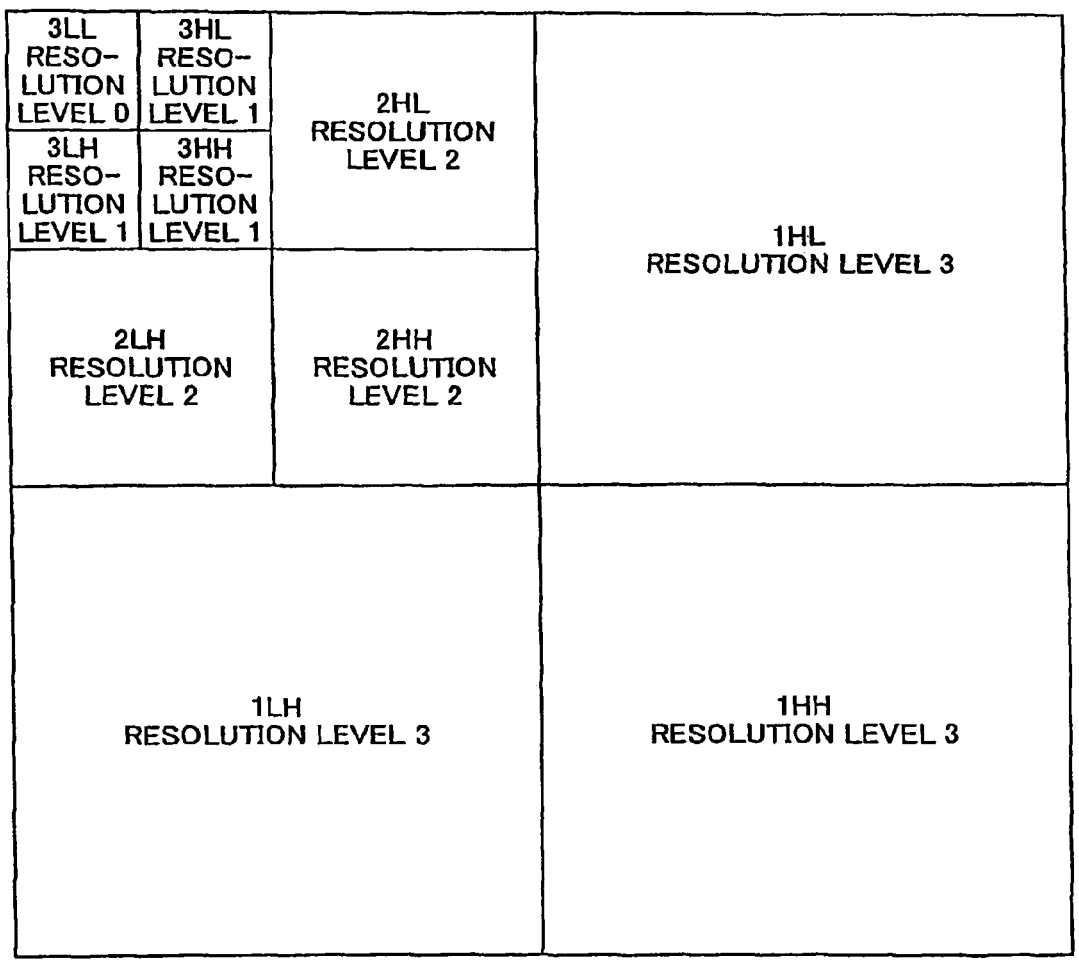
FIG. 3 is a diagram illustrating a correspondence between a decomposition level and a resolution level.

Definitions of a resolution level in an approximately reverse relationship to a decomposition level will be described with respect to FIG. 3. FIG. 3 is a diagram illustrating a correspondence between the decomposition level and the resolution level. In a case of conducting the wavelet transformation only in one dimension, the above-described process may be performed in either one of directions, and the decomposition level is indicated by the number of conducting the wavelet transformation in the one direction.

On the other hand, in a wavelet inverse transformation, with respect to a sequence of coefficients being interleaved by filtering in the horizontal direction, first, in the horizontal direction, an inverse low pass filter is conducted with a focus on pixels located at the even number (x=2i) of the x-coordinate, and then, an inverse high pass filter is conducted with a focus on pixels located at the odd number (x=2i+1) the x-coordinate.

The inverse low pass filter is calculated by the expression 17 in the above step 3, and the inverse high pass filter is calculated by the expression 18 in the above step 4. Adjacent coefficients may not exist with respect to a coefficient which is focused on. In this case, similar to the above-described mirroring process, coefficient values are compensated for by performing the mirroring process.

Accordingly, the sequence of the coefficients after the filtering in the horizontal direction is transformed (inversely transformed) into a sequence of coefficients after transforming in the vertical direction. Subsequently, similarly in the vertical direction, the inverse low pass filter is conducted with a focus on coefficients where the y-coordinate is the even number (y=2i), and then, the inverse high pass filter is conducted with a focus on coefficients where the y-coordinate is the odd number (y=2i+1). In this process, the inverse high pass filter and the inverse low pass filter are conducted for all x values. When this first wavelet inverse transformation is completed, the image illustrated in FIG. 2 is re-configured. If the wavelet transformation is conducted several times, the image in FIG. 2 is recognized as a LL sub-band, and the similar inverse transformation is repeated by using other coefficients such as HL or the like.

Next, each sub-band is divided into rectangular compartments which are called a precinct. The precinct is a compartment dividing the sub-band into rectangular compartments (that is, three sub-bands: HL, LH, and HH) and broadly expresses a position in the image. The precinct gathers the three sub-bands to be one set. However, the precinct dividing the LL sub-band is one set by one sub-band itself.

It is noted that in order to inversely transform wavelet coefficients inside the precinct, coefficients outside the precinct are required. That is, in the wavelet inverse transformation, the coefficients inside the precinct are not independent of the coefficients outside the precinct. As long as the wavelet transformation is conducted by using peripheral pixel values, the wavelet inverse transformation is also conducted by using the peripheral pixel values.

In a case of the 5×3 wavelet inverse transformations according to the above expressions (17) and (18), three coefficients including a coefficient used as a filter center are required in order to conduct the reverse low pass filter, and five coefficients including the coefficient used as the filter center are also required in order to conduct the inverse high pass filter.

Accordingly, when the coefficient to be the filter center for the inverse low pass filter is for a pixel located at a precinct boundary, precincts adjacent to the precinct boundary are required. Also, when the coefficient to be the filter center for the inverse high pass filter is for a pixel located at the precinct boundary or at one pixel further inside from the precinct boundary, precincts adjacent to the precinct boundary are required.

Similar to the above described inverse transformation, in a case of the 9×7 wavelet inverse transformation, seven coefficients including a coefficient used as the filter center are required for the inverse low pass filter, and nine coefficients including the coefficient used as the filter center are required for the inverse high pass filter. Similar to the case of the 5×3 wavelet inverse transformation, when conducting the reverse transformation, a tap of the filter crosses over an adjacent precinct, the adjacent precinct is required.

Figure 4:
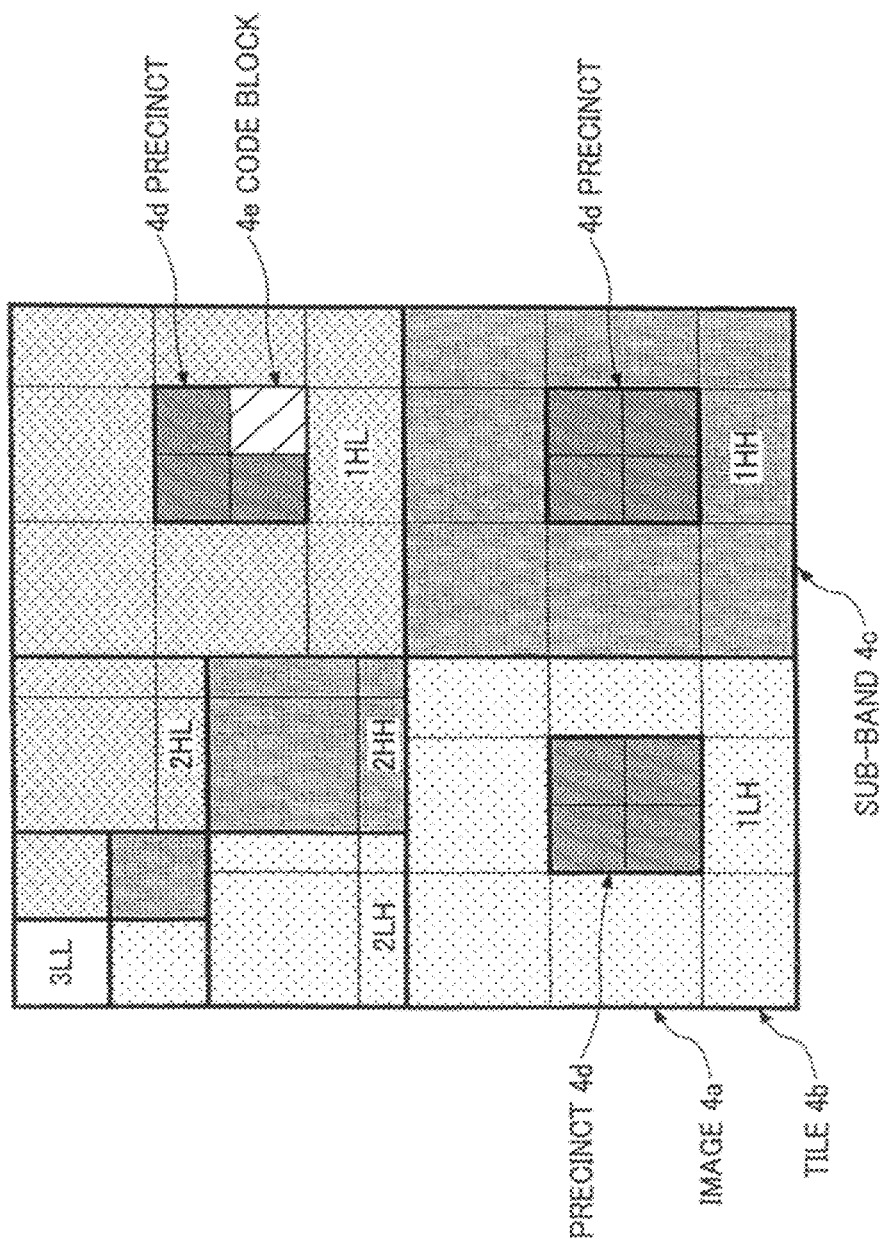
FIG. 4 is a diagram illustrating correspondences among an image, a tile, a sub-band, a precinct, and a code block.

Points to be concerned are explained above. The precinct can be made to the same size as the sub-band, and can be divided into rectangles which are code blocks. FIG. 4 is a diagram illustrating correspondences among an image, a tile, a sub-band, a precinct, and a code block.

Accordingly, an order of physical sizes is expressed by image $4a$≥tile $4b$>sub-band $4c$≥precinct $4d$≥code block $4e$. A correspondence between the decomposition level (the number of conducting the wavelet transformation) and the resolution level is as illustrated in FIG. 3.

After the above described dividing process, an entropy coding (a bit-plane coding) is conducted for each code block and in a bit-plane sequence. A portion of codes of the bit-plane are extracted and gathered from all code blocks included in the precinct. For example, codes of the bit-plane from an MSB (Most Significant Bit) to the third bit-plane are gathered in all code blocks. The gathered codes to which a header is attached is called packet.

Since the portion of the codes of the bit-plane can be empty, contents of the packet may be empty within the meaning of code. Information concerning codes included in the packet is included in the packet header, and each packet can be processed independently. The packet is a unit of codes.

By gathering packets of all precincts (=all code blocks=all sub-bands), a portion of codes of the entire image is formed. For example, codes of the bit-planes from the MSB to the third bit-plane correspond to the portion of the entire image. This is called a layer.

In general, since the layer is the portion of codes of the entire image, an image quality is improved by increasing the number of layers to be decoded. That is, the layer is a unit of the image quality.

If all layers are gathered, codes of all bit-planes are gathered to form the entire image.

The generated packets are aligned in accordance with segmentations of layers, and a final code sequence is formed. Each of the packets includes the following four attributes:
 belongs to which component (symbol C)
 belongs to which resolution level (symbol R)
 belongs to which precinct ("position") (symbol P)
 belongs to which layer (symbol L).
In this embodiment, the above four attributes are called progression attributes.

The packet header exists at the beginning of the packet. An MQ code (packet data) follows after the packet header. An arrangement of the packets is determined by a progression order indicating how to hierarchically arrange attributes regarding the packet header and the packet data. The progression order is defined by the following one of five orders:
 layer>>resolution>>component>>position
 resolution>>layer>>component>>position
 resolution>>position>>component>>layer
 position>>component>>resolution>>layer
 component>>position>>resolution>>layer In the following, a scheme in which an encoder arranges the packets in accordance with the progression order, and a scheme in which a decoder interprets the attributes of the packets will be described.

In a case in that the progression order is an LRCP (Layer-Resolution-Component-Position), a standard description is as follows:

```
for (layer){
    for (resolution){
        for (component){
            for (precinct){
                when encoding: arrange packets
                when decoding: interpret attributes of the packets
            }
        }
    }
}
```

In this hierarchical order, the arrangement of packets is conducted (when encoding), and the interpretation of packets is conducted (when decoding). As described above, each packet includes the packet header, and the packet header describes:

whether or not the packet is empty, which code block the packet includes, how many zero bit-planes for each code block are included in the packet, how many coding paths (bit-planes) for each code block are included in the packet, and a code length for each code block included in the packet.

However, the packet header does not describe at all regarding a layer number, a resolution number, and a like. In order to recognize that the packet is for which layer and which resolution, the above-described a "for" loop may be formed from the progression order described in a COD maker or a like in a main header, a break of the packet may be determined from a summation of the code lengths of all code blocks included in the packet, and a location in the "for" loop where each packet is handled may be determined.

This means that if the code length in the packet header is simply read out, a next packet is detected without decoding the entropy code itself, that is, it is possible to access a desired packet.

Figure 5:
FIG. 5 is a diagram schematically illustrating a layer progressive code.
Figure 6:
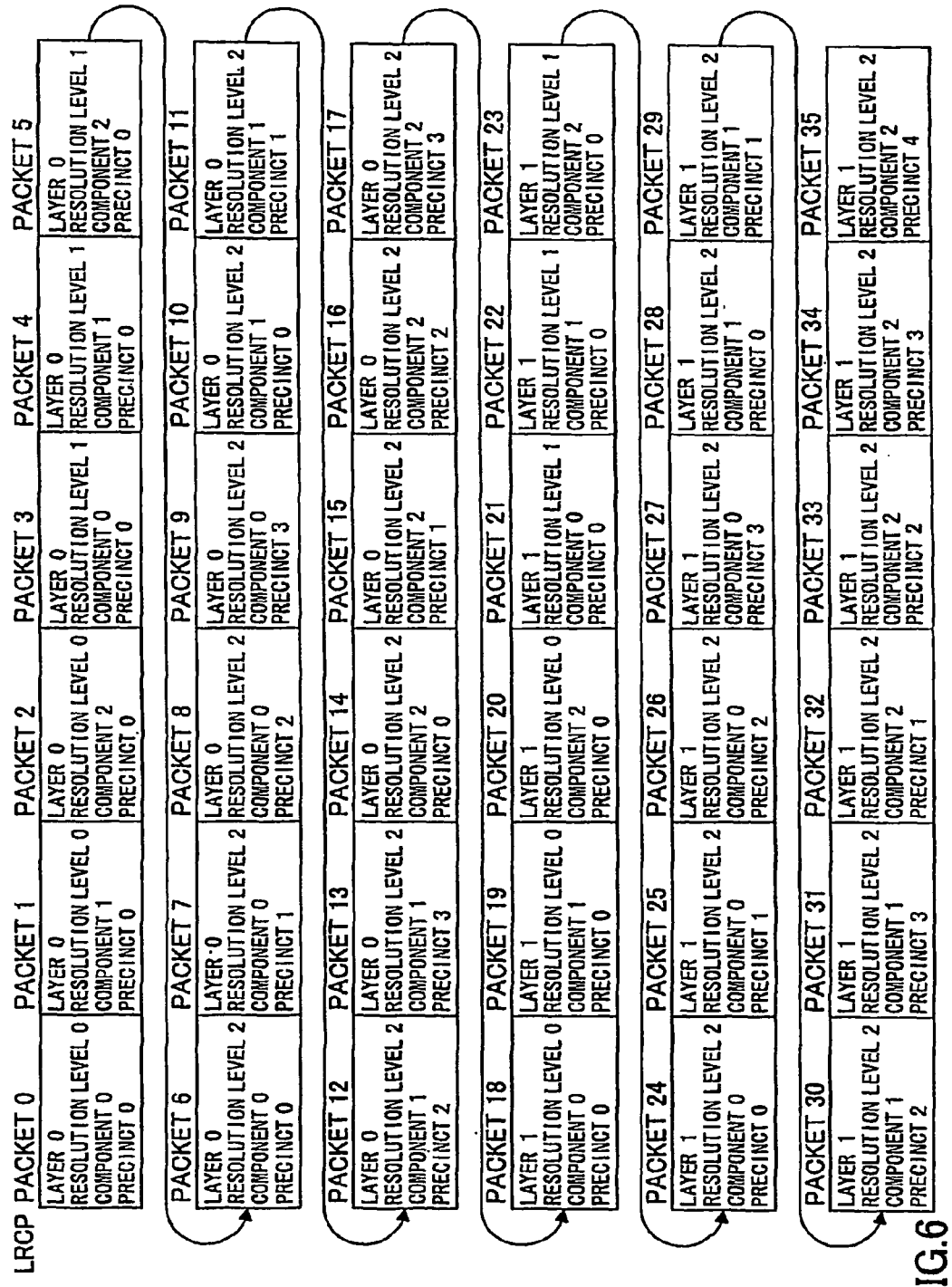
FIG. 6 is a diagram illustrating a packet arrangement of LRCP.

FIG. 5 schematically illustrates a layer progression code where the layer positions outermost the "for" loop. FIG. 6 illustrates an arrangement example of 36 packets in a case of an image size of 100×100 pixels, 2 layers, a resolution level 3 (0 to 2), 3 components (0 to 2), a precinct size of 32×32, and an LRCP progression.

In the above described JPEG 2000 coding method, the wavelet transformation has a correspondence with the location of the original image, and the precinct indicates the position. In order to inversely transform the wavelet coefficients in the precinct, coefficients outside the precinct are required. Packets of the precincts, which are sufficient to conduct a frequency inverse transformation with respect to an area of a predetermined resolution, are packets of a first precinct group including coefficients corresponding to the area of the predetermined resolution and a second precinct group (hereinafter, also called an adjacent precinct group) being adjacent to the first precinct group necessary to conduct the frequency inverse transformation with respect to coefficients corresponding to the area of the predetermined resolution.

However, the second precinct group adjacent to the first precinct group, which is necessary to conduct the frequency inverse transformation with respect to the coefficients corresponding to the area, is not always required, if an adequate frequency inverse transformation is required.

As described above, the frequency inverse transformation can be conducted by copying the coefficients of the first precinct group by using the mirroring process. However, values after this frequency inverse transformation itself are not normalized values. As a result, the image is degraded. On the other hand, if the second precinct group is not transmitted, an amount of codes to be transmitted can be reduced, and traffic can be improved. Concerning the above discussion, an information processing apparatus will be described.

<System Configuration>

Figure 7:
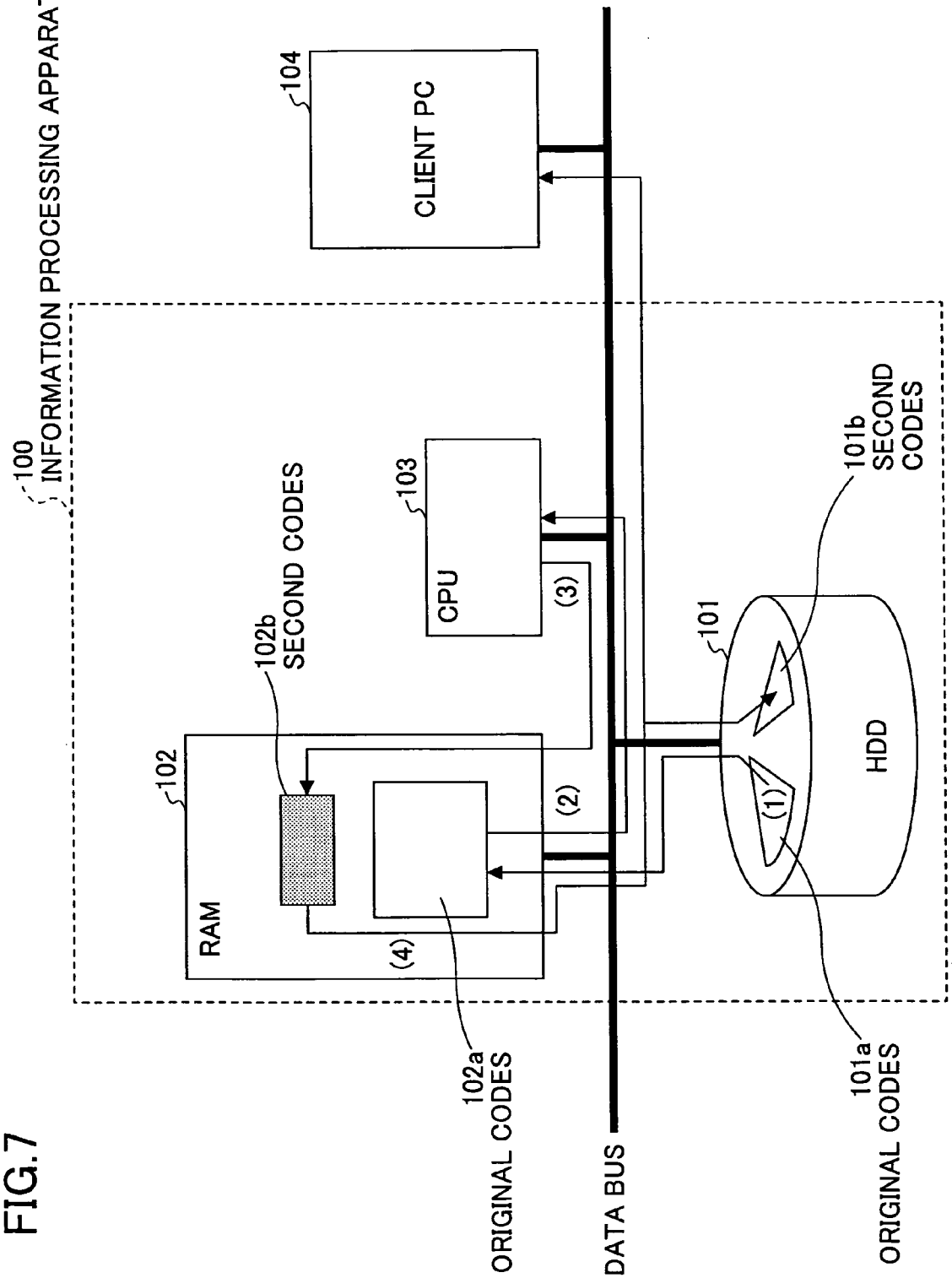
FIG. 7 is a diagram illustrating a schematic configuration of an information processing apparatus according to the present invention.

FIG. 7 is a diagram illustrating a configuration of a system using an information processing apparatus according to the present invention. The information processing apparatus 100 according to the present invention includes an HDD (Hard Disk Drive) 101, and a RAM (Random Access Memory) 102, a CPU (Central Processing Unit) 103, and is connected to a client PC (Personal Computer) 104 via a data bus.

A schematic process according to the present invention in the information processing apparatus 100 will be described with reference to FIG. 7. First, original codes 101a of the original image being stored in the HDD 101 are read into the RAM 102 in accordance with an instruction from the CPU 103.

Next, the CPU 103 reads out the codes stored in the RAM 102, and selects second codes 102b. Details of a code extraction process will be described later. In short, it is a process to select whether or not to extract codes of adjacent precincts.

The CPU 103 writes the second codes 102b into another area in the RAM 102. Also, the second codes 102b are recorded as second codes 101b in the HDD 101 by an instruction from the CPU 103.

Moreover, when the client PC 104 is connected to the data bus, the client PC 104 indicates a predetermined image area to the information processing apparatus 100 (functioning as a server), and the information processing apparatus 100 receives the indicated image area. Information received by the information processing apparatus 100 includes code (a code file name) of an image indicated by the client PC 104, a resolution of the image, a size (roff, and rsize) of a display window (request window), and a like.

Next, the original codes 101a of the original image recorded in the HDD 101 are read into the RAM 102 by an instruction of the CPU 103. Then, the CPU 103 reads out the code stored in the RAM 102, and selects the second codes 102b corresponding to a rectangular area requested by the client PC 104, by applying the code extraction process. Next, by an instruction from the CPU 103, the second codes 102b are transmitted to the client PC 104.

In the present invention, by an indication of a desired image area from the client PC 104 to the information processing apparatus 100 (server), both a resolution and an area desired to display are indicated similar to the JPIP.

<Main Functional Configuration of Information Processing Apparatus According to First Embodiment>

Figure 8:
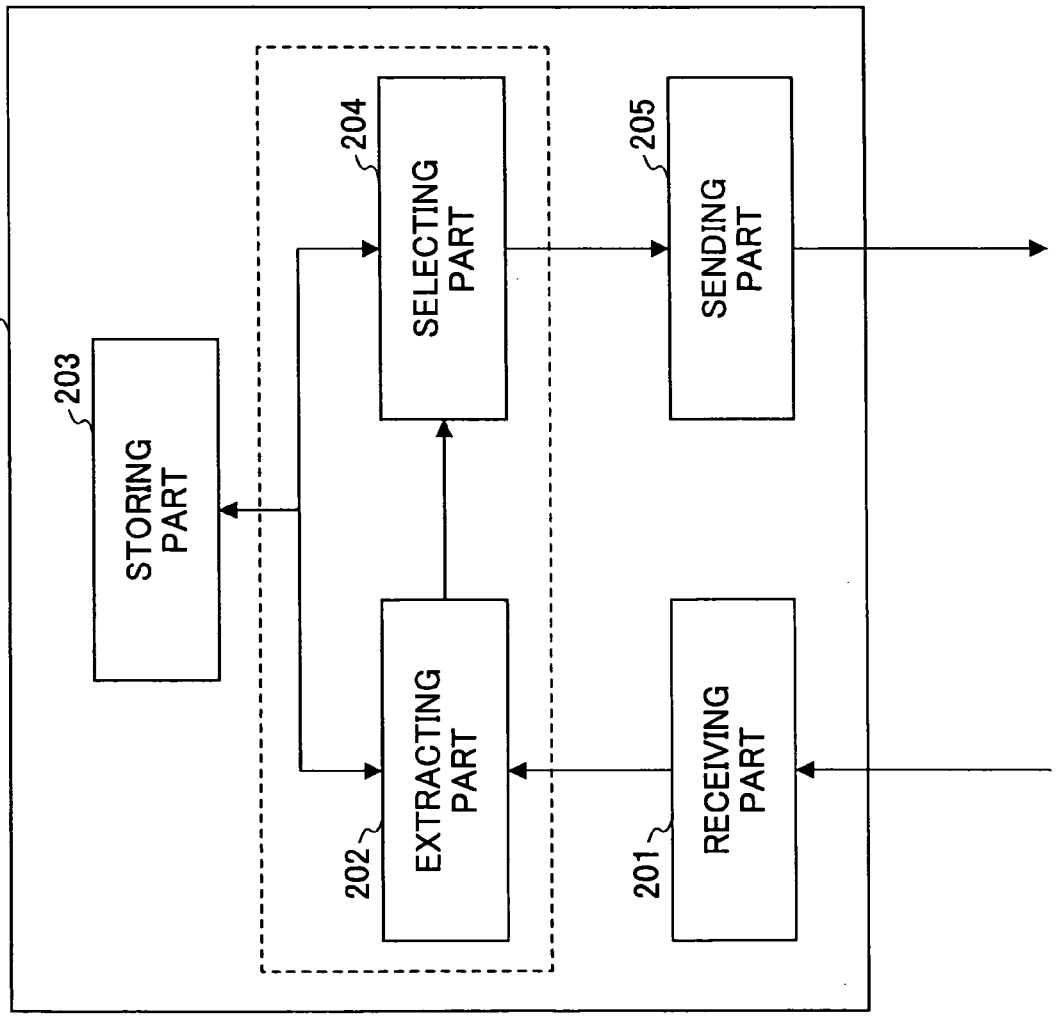
FIG. 8 is a block diagram illustrating a main functional configuration of the information processing apparatus according to the first embodiment.

FIG. 8 is a block diagram illustrating a main functional configuration of the information processing apparatus according to the first embodiment. In the main functional configuration illustrated in FIG. 8, the information processing apparatus 100 includes a receiving part 201, an extracting part 202, a storing part 203, a selecting part 204, and a sending part 205.

The receiving part 201 receives predetermined image information indicated by an input unit (a keyboard, a mouse, or a like) of a client PC or an information processing apparatus. The image information is identification information (a code file name) of code of the image, resolution image of the image, area information of the image, and a like.

The extracting part 202 selects one or more precincts including a predetermined image area received by the receiving part 201, from the storing part 203, sets the selected one or more precincts as the first precinct group, and extracts codes corresponding to the first precinct group from the storing part

203. Also, the extracting part 202 outputs the extracted codes and the first precinct group to the selecting part 204.

The storing part 203 stores codes resulted from encoding an image by the JPEG 2000 scheme. As above described, the codes stored in the storing part 203 can be read out for each of image areas, resolutions, or a like.

The selecting part 204 selects whether or not to extract codes influencing the decoding of the codes of the first precinct group, based on a signal indicating whether or not to extract contents of a policy which can be set beforehand or codes influencing encoding of codes of the first precinct group received by the receiving part 201.

When extracting the codes influencing the decoding of codes of the first precinct group, the selecting part 204 extracts codes of precincts adjacent to the first precinct group in addition to the codes of the first precinct group, and outputs both the codes influencing the decoding of the codes of the first precinct group and the codes of the adjacent precincts to the sending part 205.

When the selecting part 204 does not extract the codes influencing the decoding of the codes of the first precinct group, the selecting part 204 outputs the codes extracted by the extracting part 202.

The sending part 205 sends codes acquired by the selecting part 204 to the client PC 104 or the like. In a case of decoding and displaying codes extracted by the information processing apparatus 100 itself, it is not required to output via the sending part 205.

In the above, the extracting part 202 is separated from the selecting part 204. Alternatively, the extracting part 202 and the selecting part 204 can be configured together as one processing part. Also, the selecting part 204 may determine beforehand whether or not to further extract the codes of the adjacent precincts, and then, the extracting part 202 may extract the codes corresponding to the selected precincts.

Figure 9A:
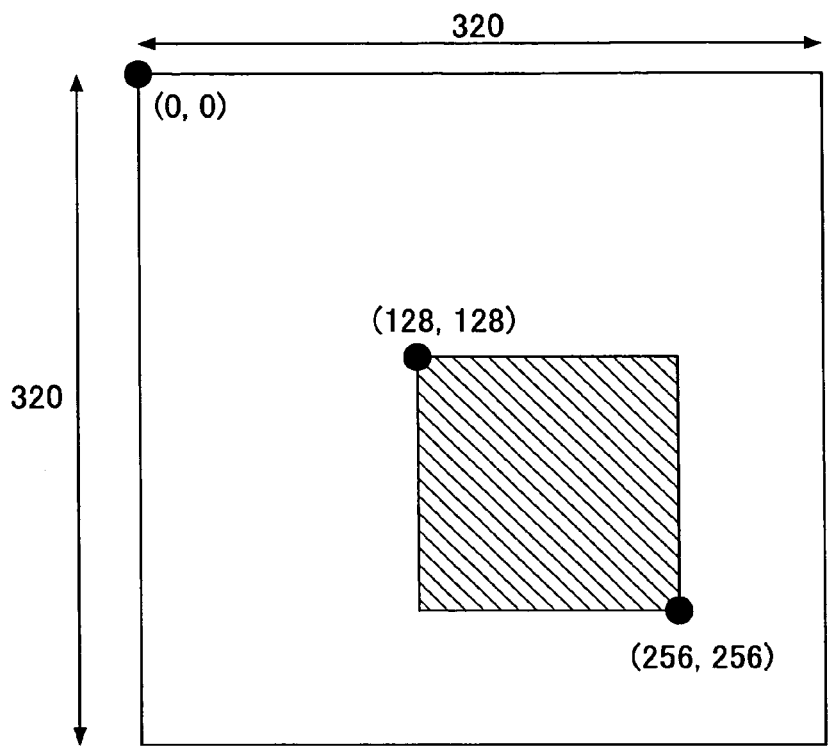
FIG. 9A is a diagram illustrating an example of a request window and FIG. 9B is a diagram illustrating an example of precincts corresponding to the request window.
Figure 9B:
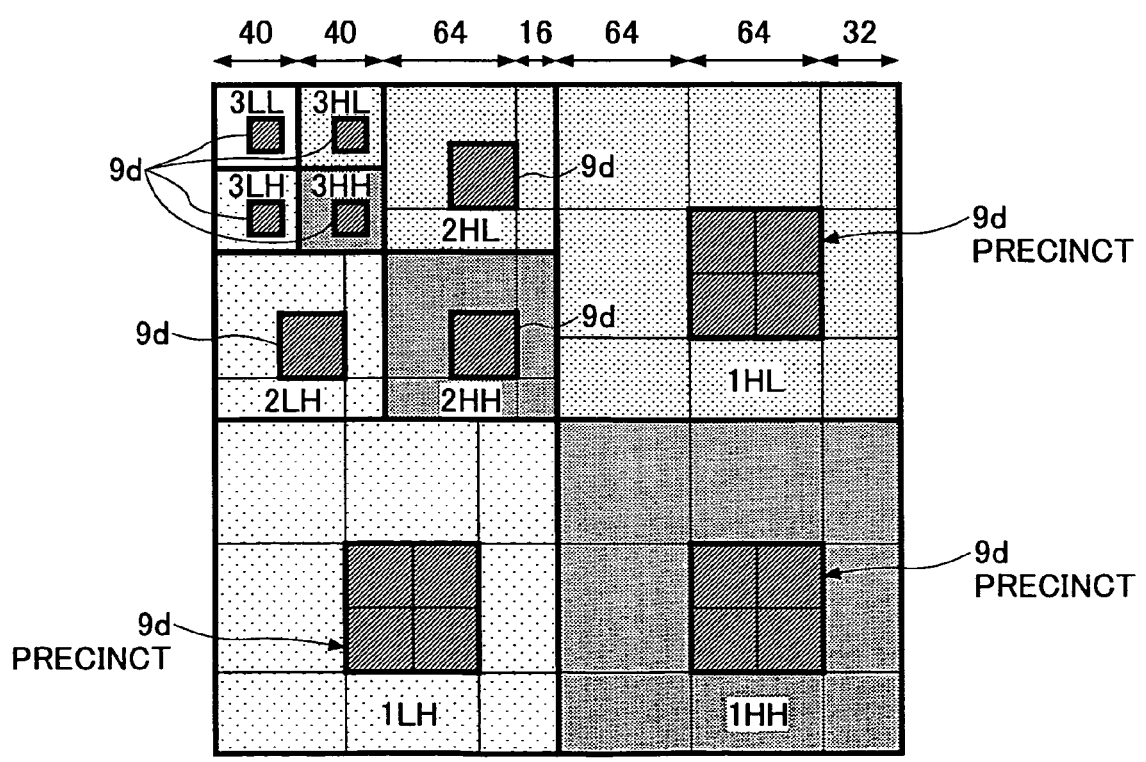

The image area information (request window) to be received and precincts corresponding thereto will be described with reference to FIG. 9A and FIG. 9B. FIG. 9A and FIG. 9B are diagrams illustrating a correspondence between the request window and the precinct.

For example, with respect to an image of 320×320 pixels as illustrated in FIG. 9A, an area having a size of 128×128 pixels is indicated as the predetermined image area by using JPIP in that an upper left is set as an original point and a point (128, 128) is an apex, and the following are indicated:

$f$size=$(fx,fy)$=(320,320)(indication of resolution), $r$off=$(ox,oy)$=(128,128)(indication of area offset), and $r$size=$(rx,ry)$=(128,128)(indication of area size).

The wavelet transformation is conducted three times with respect to the original image, and the original image is divided into precincts 9d having a 64×64 coefficient size. In this case, the wavelet coefficients corresponding to the predetermined image area are coefficients corresponding to 10 squares as the precincts 9d surrounded by bold lines in FIG. 9B.

Accordingly, the information processing apparatus 100 is required to send codes of precincts including the 10 squares. Since 3LL is one precinct, and 3HL-3LH-3HH is also one precinct, a respective precinct may be transmitted for these sub-bands.

On the other hand, 2HL-2LH-2HH is four precincts, and it is appeared to send one precinct at an upper left. However, as described above, in order to accurately conduct the wavelet inverse transformation with respect to the coefficients in the precincts, precincts adjacent above and below and at right side and left side are required.

In a case of assuming that the 5×3 wavelet transformation is used for the codes in the first embodiment, when a coefficient to be the filter center in the inverse low pass filter is located at the precinct boundary, precincts adjacent to the precinct boundary are required.

Moreover, when a coefficient to be the filter center in the inverse high pass filter is located at the precinct boundary or at one precinct further inside the precinct boundary, precincts adjacent to the precinct boundary are required.

<Extraction Process for Codes Corresponding to Predetermined Image Area>

Figure 10:
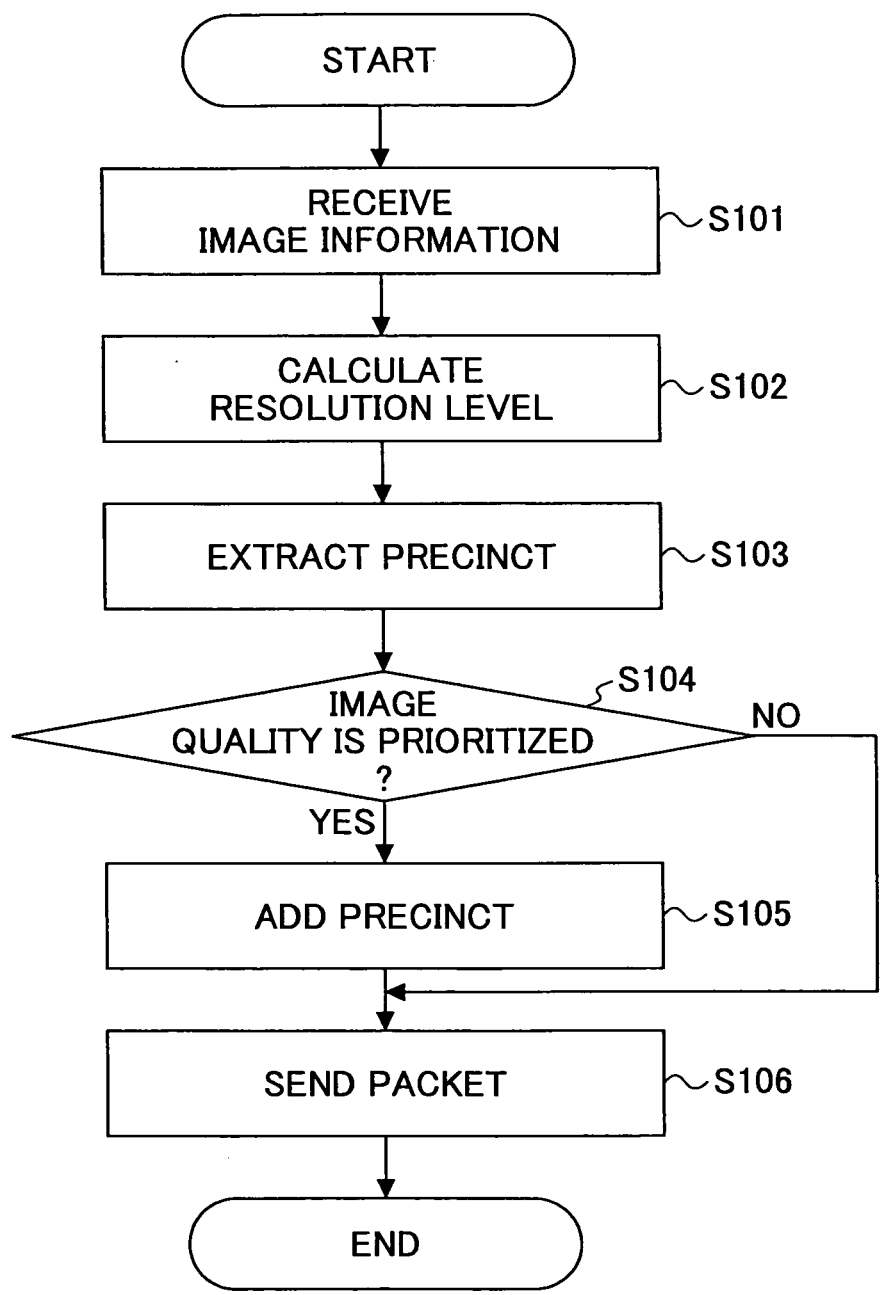
FIG. 10 is a flowchart for explaining the entire process in the first embodiment.

FIG. 10 is a flowchart for explaining the extraction process of codes corresponding to a predetermined image area in the information processing apparatus 100 according to the first embodiment. In the extraction process illustrated in FIG. 10, it is assumed that the extracting part 202 and/or the selecting part 204 extract precincts, and the sending part 205 acquires and sends packets corresponding to the precincts. As described above, the extracting part 202 extracts the codes corresponding to the precincts.

In step S101, the receiving part 201 receives an indicated predetermined image information, and outputs the received image information to the extracting part 202. The image information includes information indicating a code file name, a resolution of an image, a size of a predetermined area, a location of the predetermined area, and a like.

By advancing to step S102 following the step S101, first, the extracting part 202 calculates a resolution level r, based on information acquired from the receiving part 201. A method for calculating the resolution level r will be described later with reference to FIG. 11.

By advancing to step S103 following the step S102, the extracting part 202 reads out a precinct size from a COD marker in codes stored in the storing part 203. Then, the extracting part 202 extracts a precinct group including a display area, from roff and rsize acquired from the receiving part 201, regarding all resolution levels less than or equal to the calculated resolution level r.

By advancing to step S104 following the step S103, the selecting part 204 determines whether or not to extract precincts (also called adjacent precincts) adjacent to a precinct group which is to be extracted by the extracting part 202, based on the policy (it is assumed that a policy of prioritizing the image quality) set beforehand or the signal which the receiving part 201 receives from the client PC 104.

When it is determined to extract the adjacent precincts, this process advances to step S105, and the selecting part 204 extracts an adjacent precinct group less than or equal to the resolution level r in addition to the first precinct group. When it is determined not to extract the adjacent precincts, the selecting part 204 does not add the adjacent precinct group. This process for adding precincts will be described with reference to FIG. 12.

By advancing to step S106 following to step S105, the sending part 205 sends packets belonging to the extracted precinct group.

Figure 11:
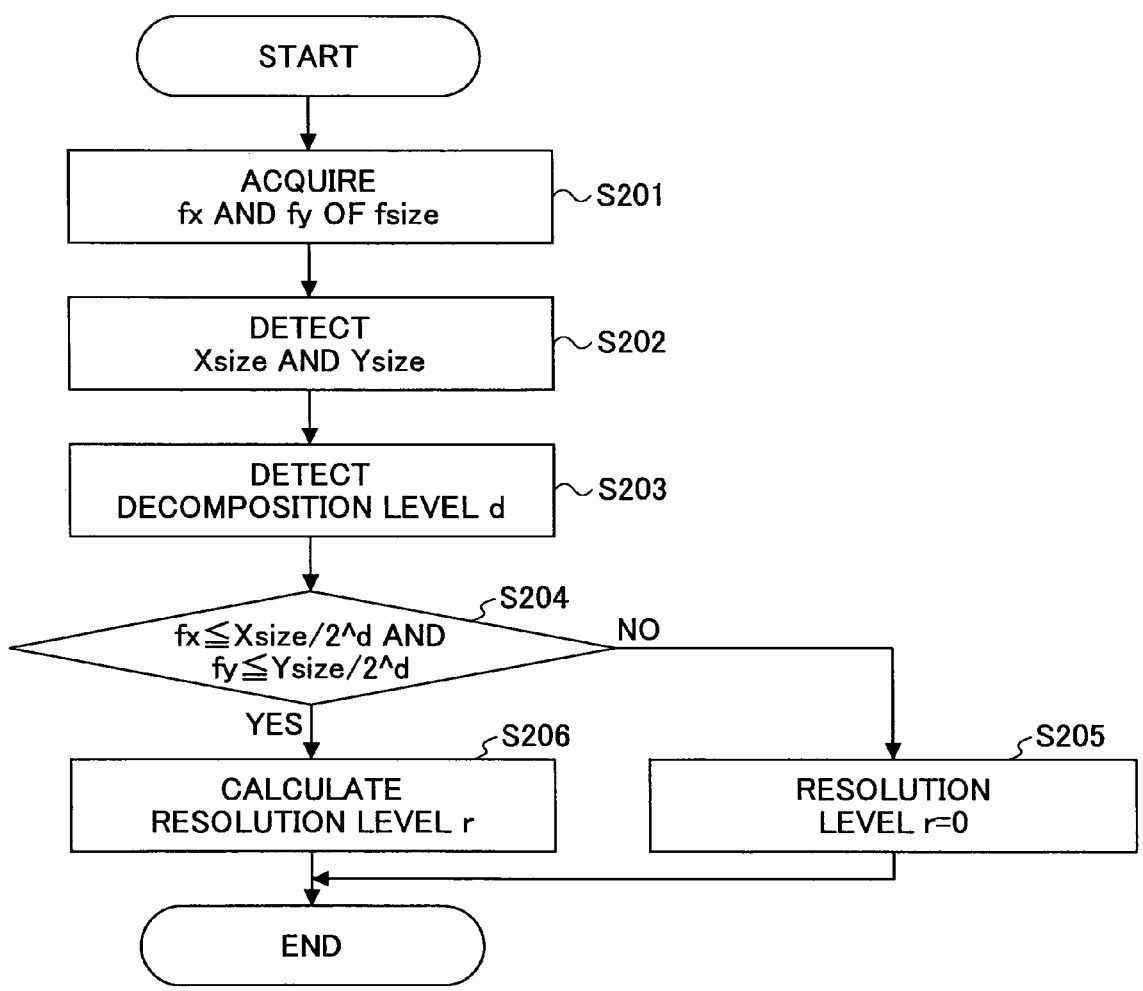
FIG. 11 is a flowchart for explaining a process for calculating a resolution level in the first embodiment.

Next, a process for calculating the resolution level r in the step S102 will be described with reference to FIG. 11. FIG. 11 is a flowchart for explaining the process for calculating the resolution level r. It is noted that the extracting part 202 includes an operation part, and the entire process illustrated in FIG. 11 is conducted by the extracting part 202.

In step S201, fx and fy of fsize are acquired from the receiving part 201. By advancing to step S202 following the step S201, the extracting part 202 detects a lateral direction pixel number (Xsize) and a longitudinal direction (Ysize) of an original image from an SIZ marker of an image of the indicated code file name.

By advancing to step S203 following the step S202, the extracting part 202 detects a decomposition level number d from a COD marker segment of the image of the indicated code file name. The SIZ marker segment and the COD marker segment are detected by appropriately reading out from the storing part 203.

By advancing to step S204 following the step S203, it is determined whether or not both of the following expressions are satisfied:

$$fx \leq Xsize/2^d \qquad (31)$$

$$fy \leq Ysize/2^d \qquad (32).$$

If one of or both expressions (31) and (32) are not satisfied (NO), this process advances to step S205, and the resolution level r is set to be 0 (zero). If both expressions (31) and (32) are satisfied (YES), this process advances to step S206 and the resolution level r is calculated.

The resolution level r is calculated by the following expression:

$$r = d - \min[\log 2(Xsize/fx), \log 2(Ysize/fy)] + 1 \qquad (33).$$

The resolution level r is calculated in accordance with the expression (31).

Precincts are extracted by processes of the step S103 and the step S105 based on the above described resolution level r.

Figure 12:
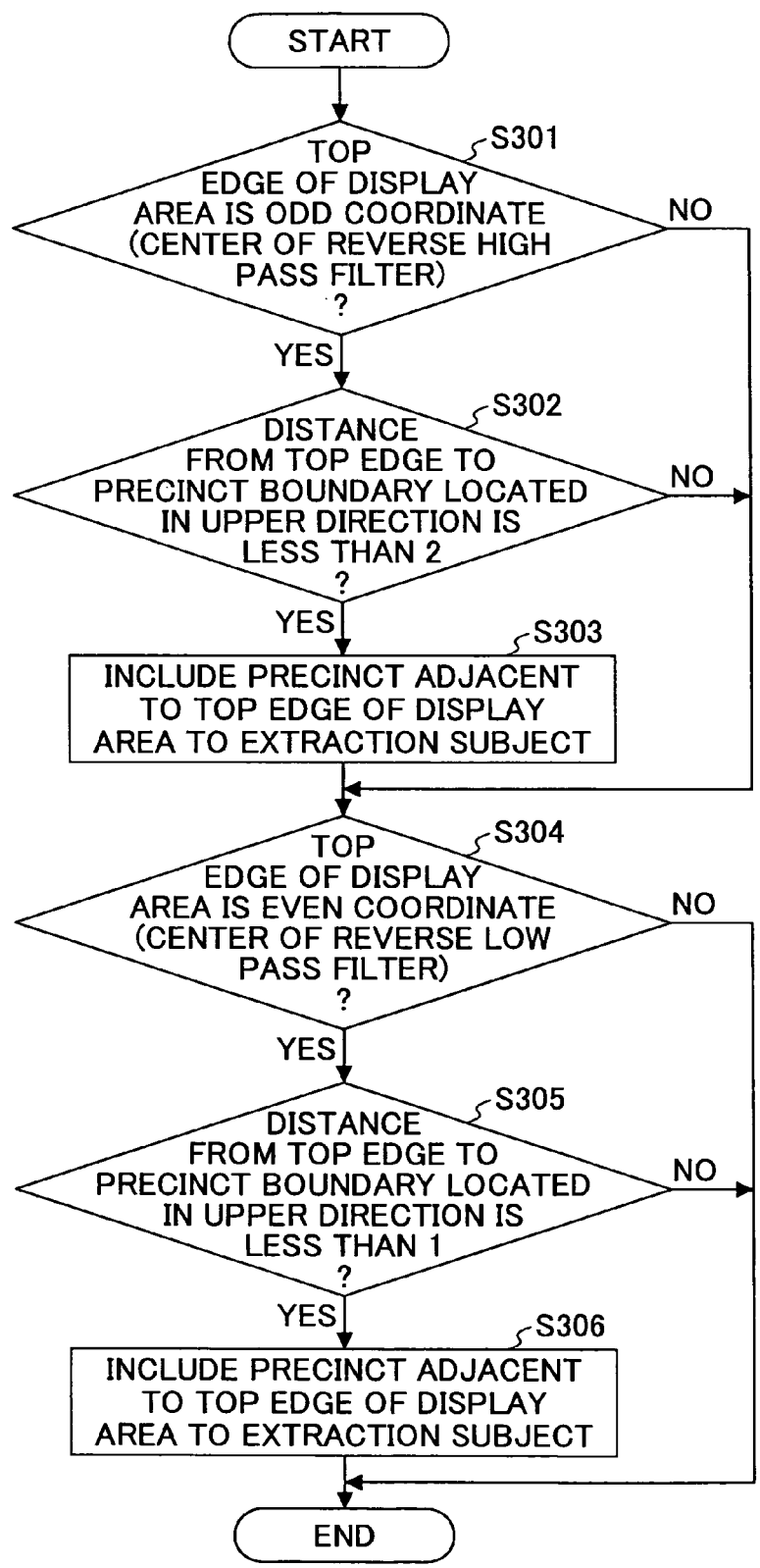
FIG. 12 is a flowchart for explaining a process for adding precincts.

Next, a process for adding precincts in the step S105 will be described with reference to FIG. 12. FIG. 12 is a flowchart for explaining the process for adding precincts. The entire process illustrated in FIG. 12 is conducted by the selecting part 204. The selecting part 204 includes an operation part, and acquires a distance between a coordinate of a boundary of the display area and a coordinate of a precinct boundary.

In the step S301, the selecting part 204 determines whether or not an upper edge of the display area is an odd coordinate, that is, determines whether or not the inverse high pass filter is used for the upper edge. When a determination result of the step S301 is YES, the selecting part 204 advances to step S302, and determines whether or not a distance is less than 2 from the upper edge of the display area to the precinct boundary existing in an upward direction.

When a determination result of the step S302 is YES, the selecting part 204 advances to step S303, and includes precincts adjacent to the upper edge of the display area to an extraction subject.

When the process of the step S303 is completed and the determination result of the step S301 is NO or the determination result of the step S302 is NO, the selecting part 204 advances to step S304, and determines whether or not the upper edge of the display area is an even coordinate. That is, it is determined whether or not the inverse pass filter is used for the upper edge of the display area.

When the determination result of the step S304 is YES, the selecting part 204 advances to the step S305, and determines whether or not a distance is less than one from the upper edge of the display area to the precinct boundary existing in the upward direction.

When the determination result of the step S305 is YES, the selecting part 204 advances to the step S306, and includes precincts adjacent to the upper edge of the display area to the extraction subject. In this flowchart, the selecting part 204 advances to the step S304 when the process of the step S303 is completed. Alternatively, when the process of the step S303 is completed, the selecting part 204 may terminate this process itself for adding precincts adjacent to the edge.

As described above, the process for adding precincts concerning the upper edge of the display area is described. Also, in the same manner concerning the upper edge, the process for adding precincts can be conducted for precincts concerning a lower edge, a right edge, or a left edge.

Also, the 5×3 wavelet transformation (inverse transformation) in the process illustrated in FIG. 12 will be described. In a case of the 9×7 wavelet transformation (inverse transformation), "less than 2" in the process of the step S302 is replaced with "less than 4", and "less than 1" in the process of the step S305 is replaced with "less than 3", so as to conduct in the same manner.

According to the first embodiment, in the information processing apparatus 100 to which a predetermined image area is indicated, it is possible to extract codes corresponding to the predetermined image area by depending on whether or not an adequate wavelet inverse transformation is conducted. That is, at a side of the information processing apparatus 100, it is possible to determine whether an image quality including the adjacent precincts is prioritized or reducing traffic excluding the adjacent precincts is prioritized.

Moreover, it is determined to prioritize the image quality or reducing the traffic at a side of the client PC 104, so that the information processing apparatus 100 can select the image quality or reducing the traffic to set higher priority in response to a request of the client PC.

Furthermore, by determining codes influencing decoding of codes of the first precinct group as codes of precincts contacting at the horizontal direction or at the vertical direction of the first precinct group, it is possible to easily conduct a code extraction when selecting the image quality on a boundary of the display area.

Second Embodiment

In the following, an information processing apparatus 100 according to a second embodiment will be described. Different from the first embodiment, in the second embodiment, codes encoded by a JPEG-XR scheme are subject to be processed. First, the JPEG-XR scheme being a premise of the second embodiment will be described.

<Basic Encoding Process of JPEG-XR>

Figure 13:
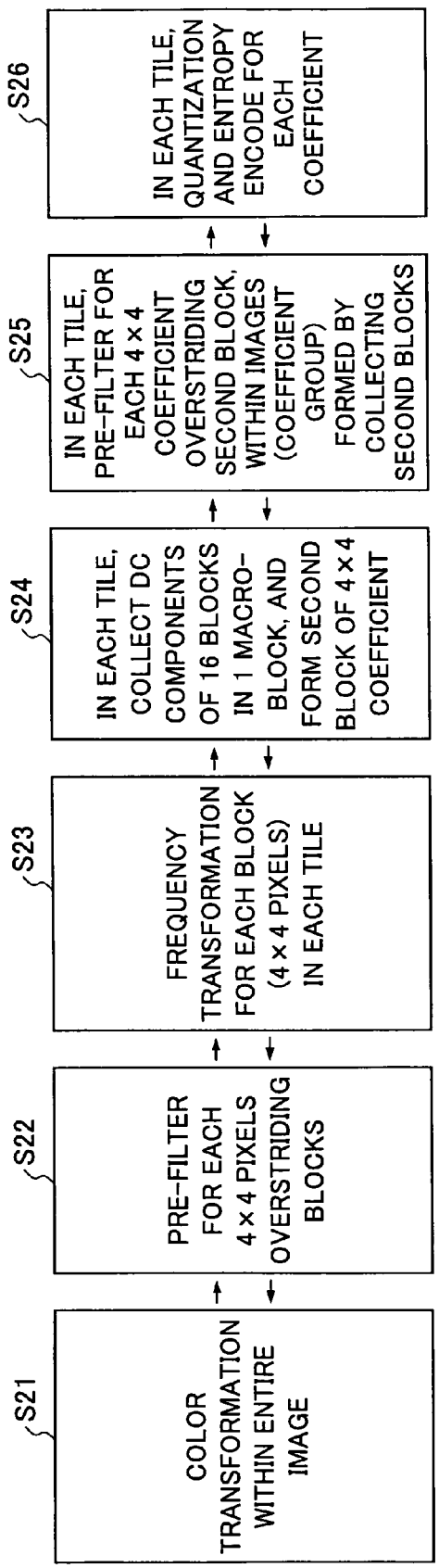
FIG. 13 is a flowchart for explaining a compression and decompression process of the JPEG-XR scheme.

FIG. 13 is a flowchart for explaining a basic encoding process of the JPEG-XR scheme.

First, in an encoding method by the JPEG-XR scheme, an original image is converted into each of components of YCgCo (step S21). The original image is divided into tiles, and each of the divided tiles is further divided into blocks having 4×4 pixels.

Figure 14:
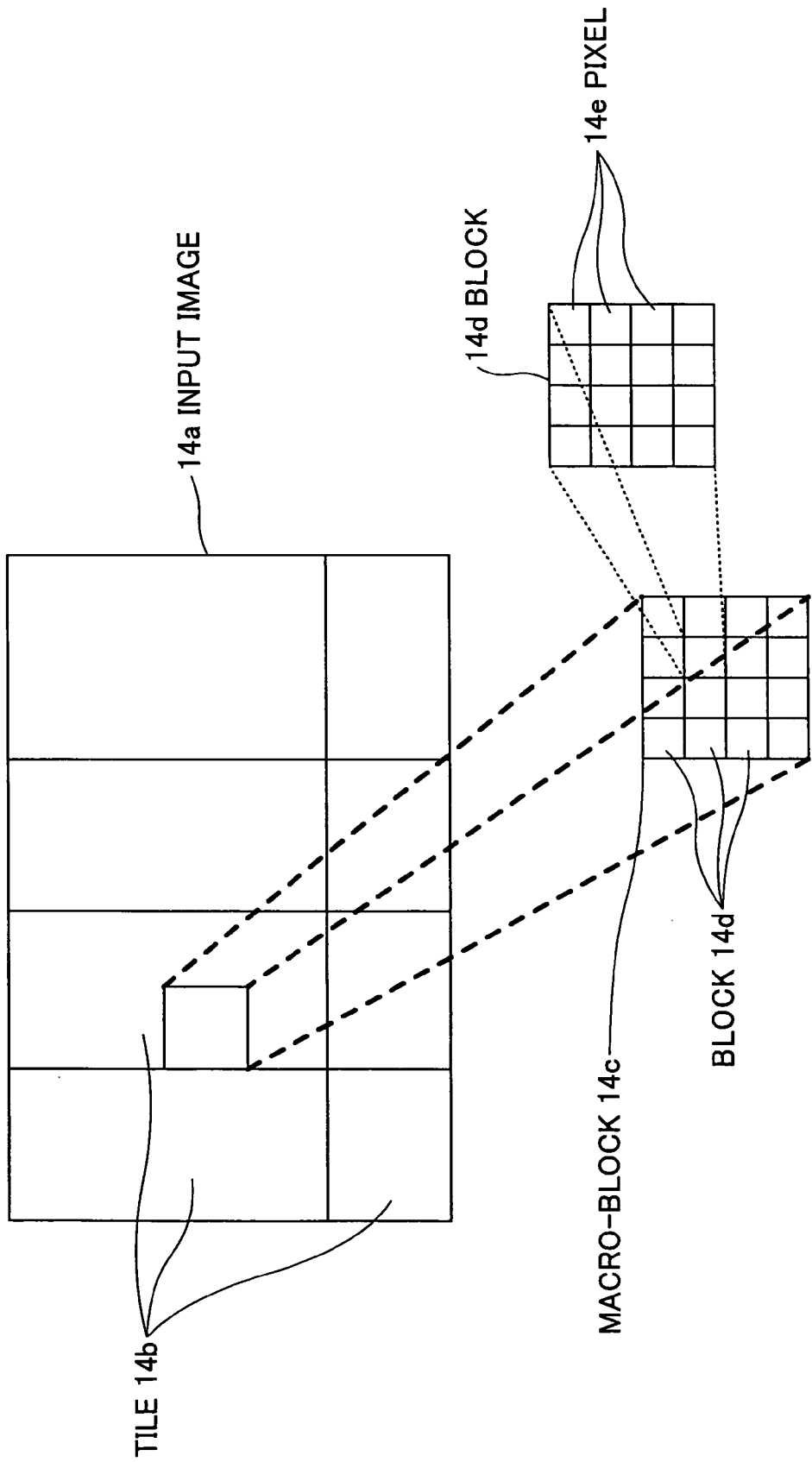
FIG. 14 is a diagram illustrating correspondences among an image, a tile, a macro block, a block, and a pixel.

FIG. 14 is a diagram illustrating correspondences among an input image, a tile, a macro block, a block, and a pixel. As illustrated in FIG. 14, the input image 14a is divided into tiles 14b, each of the tiles 14b is divided into macro blocks 14c, each of the macro blocks 14c is divided into 16 blocks 14d, and one block 14d is formed by 4×4 pixels 14e. Accordingly, a magnitude relationship is expressed as "input image 14a ≥ tile 14b ≥ macro-block 14c ≥ block 14d ≥ pixel 14e". A color transformation in encoding by the JPEG-XR scheme is conducted as follows:

$$\left.\begin{array}{l} V = B - R \\ U = R - G + \left\lceil \dfrac{V}{2} \right\rceil \\ Y = G + \left\lfloor \dfrac{U}{2} \right\rfloor \end{array}\right\} \quad (34)$$

Also, in the JPEG-XR scheme, since the frequency transformation is conducted by a block unit of 4×4 pixels, similar to a conventional JPEG, a block noise may occur when a compression rate is high. In order to reduce the block noise, a pre-filter process is conducted.

Figure 15:
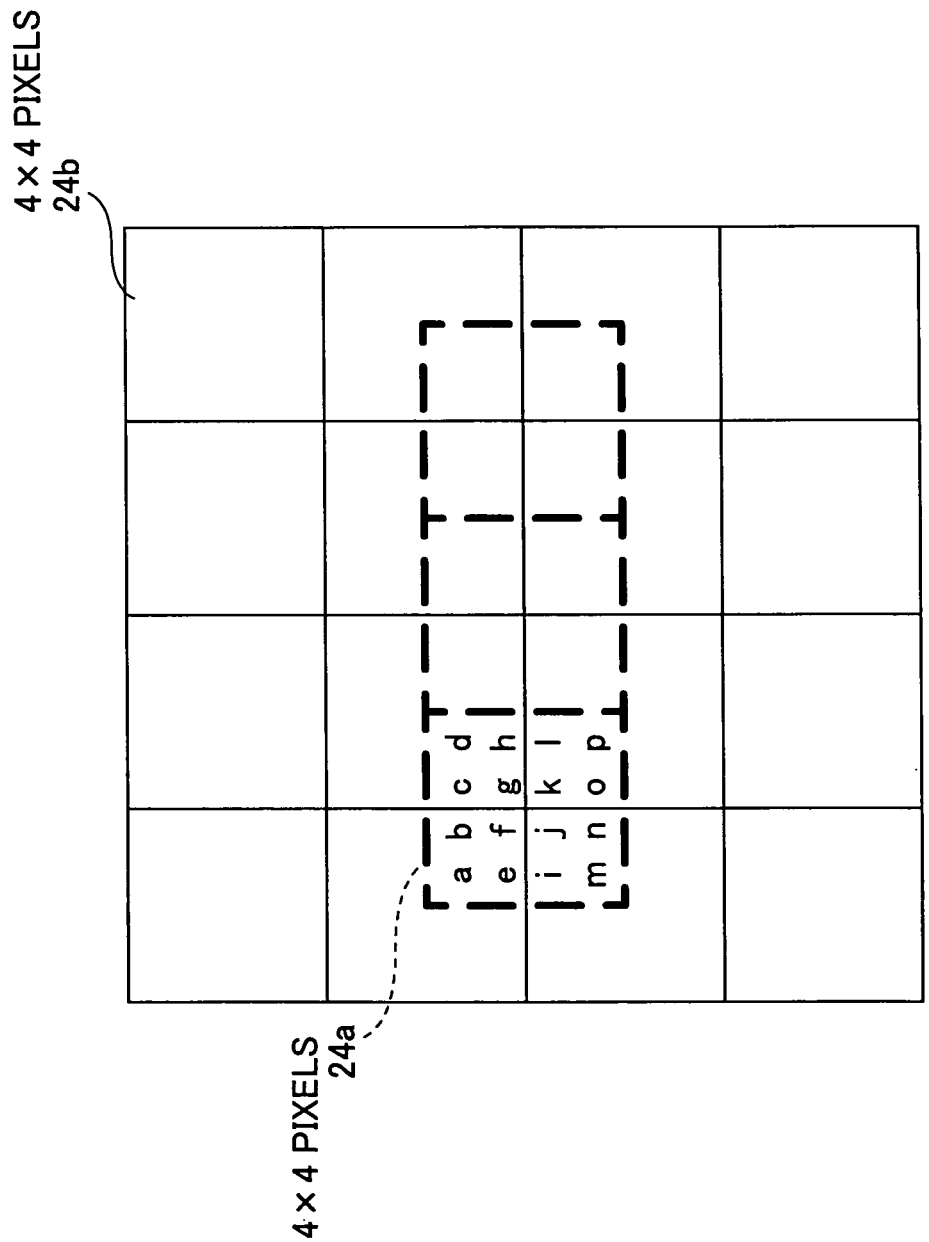
FIG. 15 is a diagram illustrating a location relationship between 4×4 pixels to which a frequency transformation is conducted and 4×4 pixels to which a pre-filter is conducted.

Referring back to FIG. 13, the pre-filter process is conducted for each set of 4×4 pixels overstriding a block (step S22). Also, this pre-filter process is conducted over a tile boundary. That is, pixels of tiles located above and below and right and left with respect to a target tile are required to conduct an inverse transformation of the pre-filter. FIG. 15 is a diagram illustrating a location relationship between 4×4 pixels to which the frequency transformation is conducted and 4×4 pixels to which the pre-filter is conducted. In FIG. 15, the pre-filter is conducted on 4×4 pixels 24a and the frequency transformation is conducted on 4×4 pixels 24b. Moreover, a letter "a" in the 4×4 pixels 24a denotes a pixel at an upper left of a unit to which the pre-filter is conducted. The pre-filter process is conducted by executing a program for the pre-filter.

Referring back to FIG. 13, the frequency transformation is conducted for each of blocks within each tile (step S23). Also, within each tile, DC components in the macro block are gathered, and a second block of 4×4 coefficients is formed (step S24). In this case, coefficients other than the gathered DC components are handled as high pass (HP) coefficients.

Next, with respect to a second image (coefficient group) formed by gathering the above described second blocks, the pre-filter process is conducted for each set of 4×4 coefficients overstriding the second blocks (step S25).

Again, within each tile, the frequency transformation is conducted for each of the second blocks. In the same manner as previously described, the DC components in the macro block are gathered within each tile, and the gathered DC components are handled as DC coefficients. Also, coefficients other than the DC components are handled as low pass (LP) coefficients.

Figure 16:
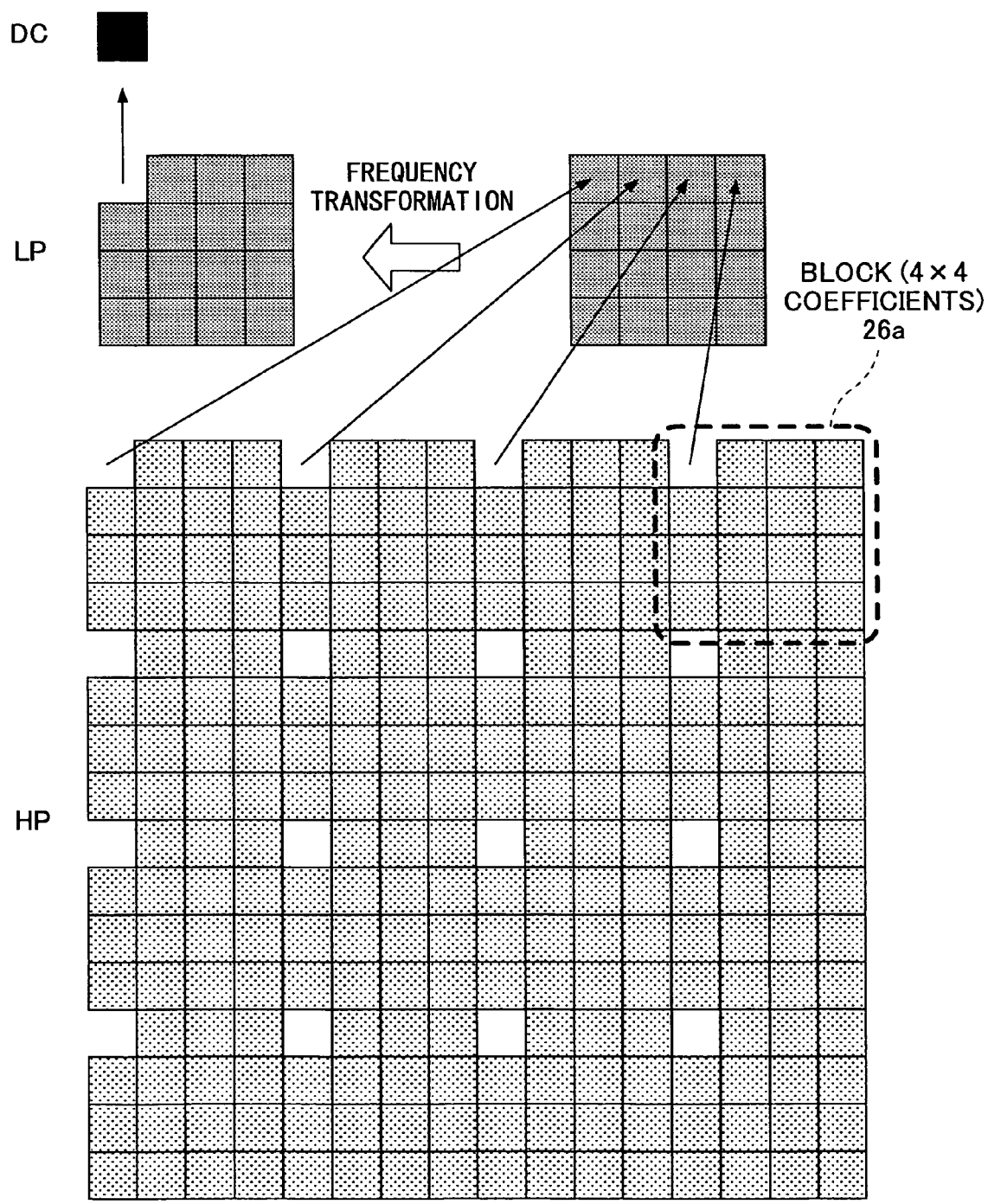
FIG. 16 is a diagram illustrating hierarchical location relationships among a DC coefficient, LP coefficients, and HP coefficients.

FIG. 16 is a diagram illustrating hierarchical location relationships among the DC coefficient, LP coefficients, and HP coefficients. For the sake of convenience, one macro block is focused on to explain. Regarding the HP coefficients illustrated in FIG. 16, the DC components are gathered for each of blocks 26a after a first frequency transformation is conducted (a state of gathering the DC components is illustrated in FIG. 16 by exemplifying a block located at an upper most left), and coefficients which are not gathered are the HP coefficient.

Regarding the LP coefficients, a second frequency transformation is conducted with respect to the DC components gathered after the first frequency transformation, and DC components after the second frequency transformation are gathered. Coefficients which are not gathered are the LP coefficients. Regarding the DC coefficients, the DC components gathered after the second frequency transformation are the DC coefficients.

Referring back to FIG. 13, by a quantization process, the DC coefficient, the LP coefficients, and the HP coefficients are linearly quantized. At the end, by an entropy encoding process, a predetermined entropy encoding is processed with respect to coefficients after the quantization is conducted (step S26). A detailed explanation of the entropy encoding is omitted. In a case of decompressing codes being encoded by the JPEG-XR scheme, the above described processes may be traced back in a reversed order.

As described above, since the codes encoded by the JPEG-XR scheme are influenced by the pre-filter process, in order to accurately decode a certain tile, codes of adjacent tiles are required. On the other hand, even if coefficients of the adjacent tiles do not exist, for example, by assuming pixel values of the adjacent tiles as zero to calculate, it is possible to conduct the inverse transformation of the pre-filter even though an error occurs. In this case, a block noise is caused.

Accordingly, for example, in a case of accessing a portion of codes encoded by the JPEG-XR scheme through a network, the correspondence between the image quality and the code amount is caused similar to the first embodiment. In the second embodiment, a basic configuration at the side of the information processing apparatus 100 is the same that in the first embodiment. A configuration in the second embodiment can be modified so that the extracting part 202 illustrated in FIG. 8 extracts tiles, and the storing part 203 stores the codes encoded by the JPEG-XR scheme, and the selecting part 204 adds tiles.

<Configuration of JPEG-XR Codes>

Figure 17:
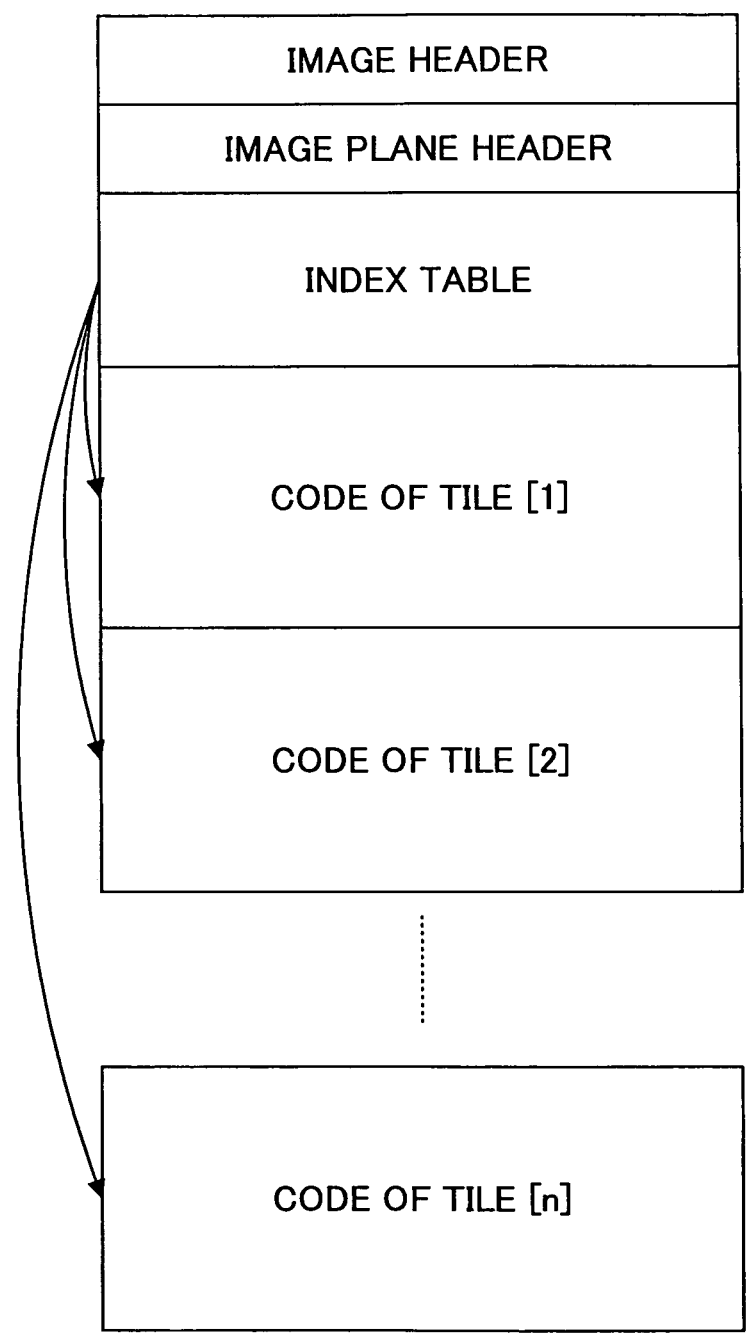
FIG. 17 is a diagram illustrating a code configuration of the entire image.

FIG. 17 illustrates a configuration of JPEG-XR codes. In the configuration in FIG. 17, a header concerning the entire image, an image plane header storing encoding conditions and a like, an index table indicating a location of entropy codes of each tile, and the entropy codes of each tile are arranged in this order.

Figure 18:
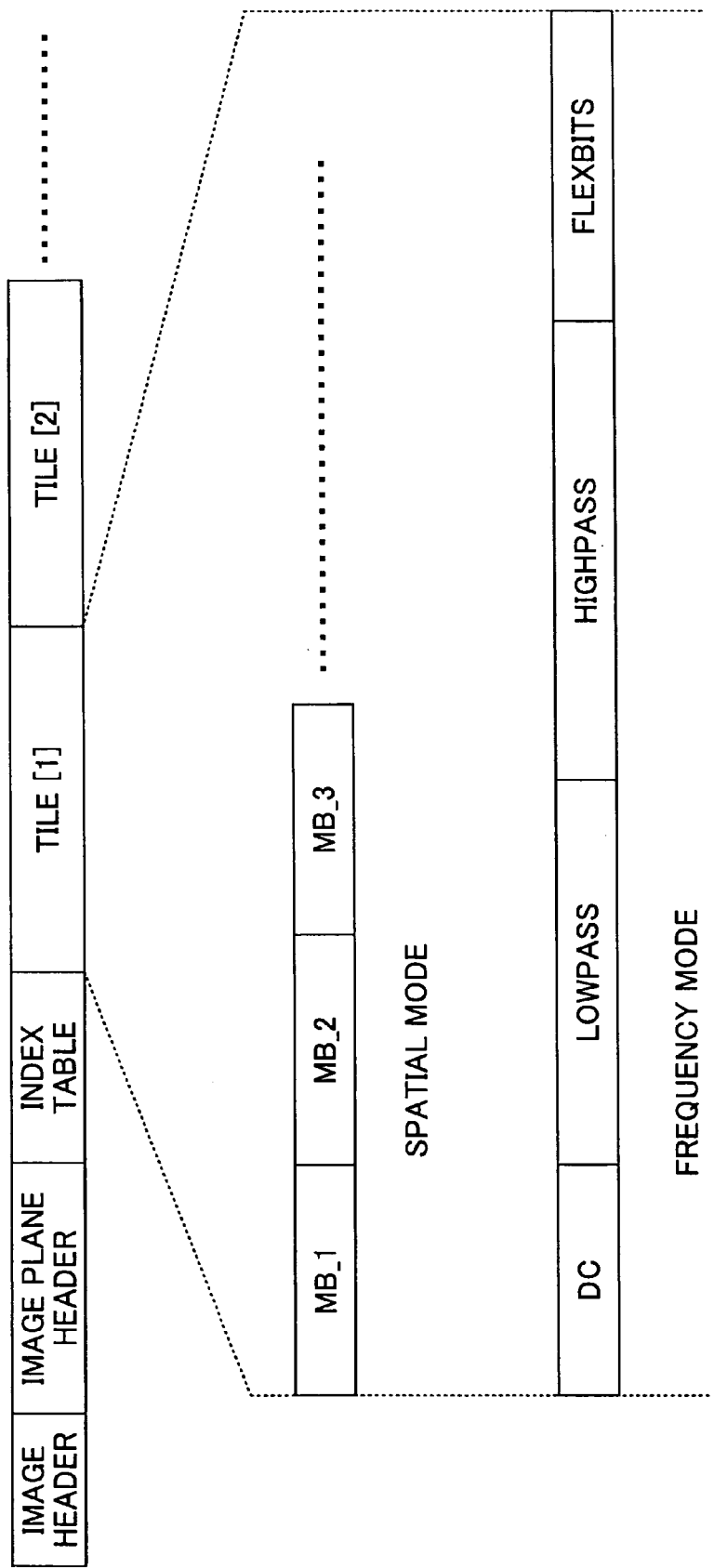
FIG. 18 is a diagram illustrating arrangements of codes of a tile in two modes in a JPEG-XR scheme.

There are two arrangements: a case (spetial mode) of arranging the entropy codes of each tile in an order of "position of a macro block->frequency" and a case (frequency mode) of arranging the entropy codes of each tile in another order of "each frequency->each macro block position". FIG. 18 is a diagram illustrating arrangements of codes of a tile in two modes: the spatial mode and the frequency mode.

<Extracting Process of Codes Corresponding to Predetermined Image Area in Second Embodiment>

Figure 19:
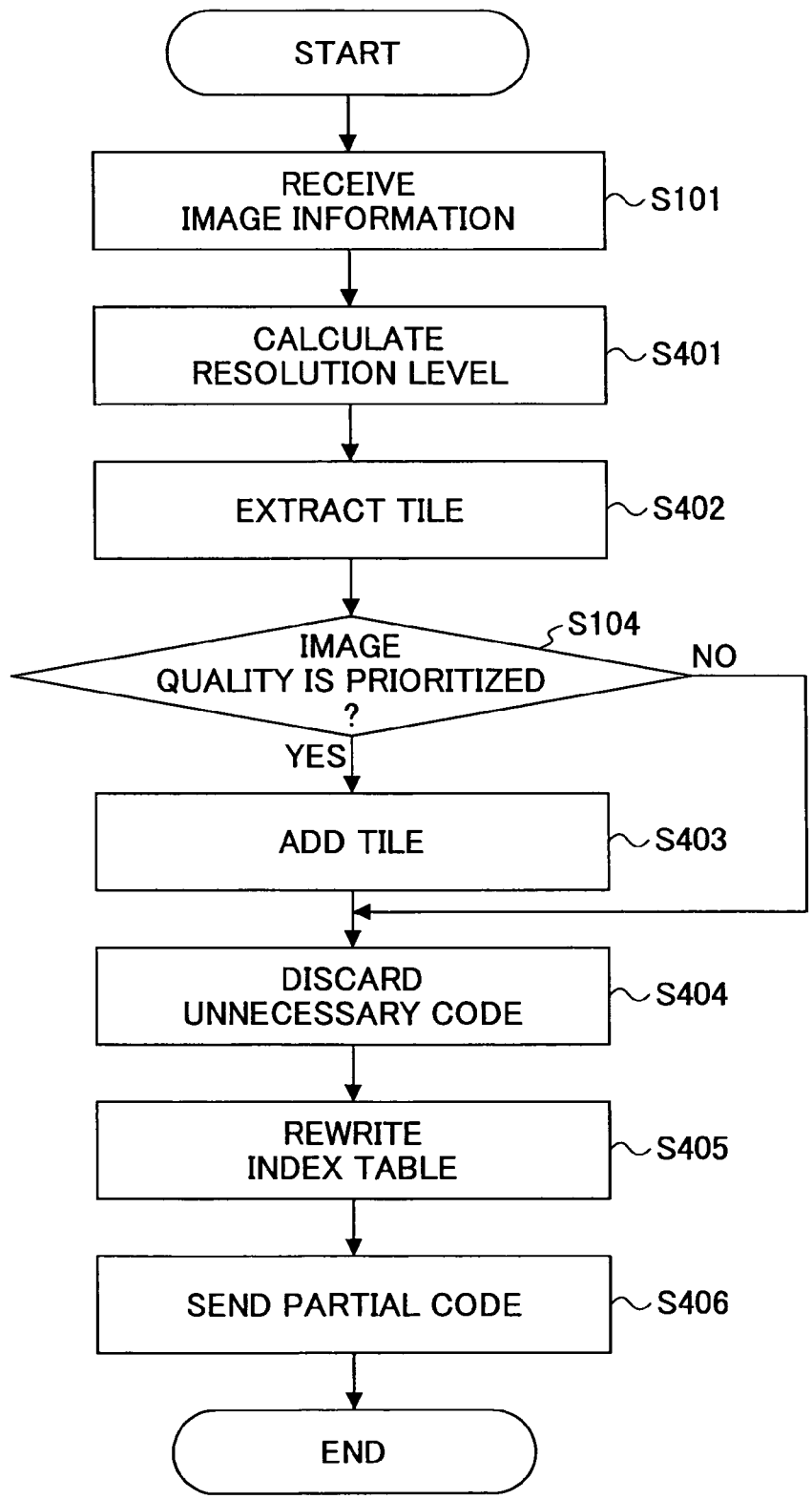
FIG. 19 is a flowchart for explaining an extracting process of codes in the second embodiment.

FIG. 19 is a flowchart for explaining an extracting process of codes corresponding to a predetermined image area in the information processing apparatus 100 according to the second embodiment. In the extracting process in FIG. 19, the extracting part 202 and the selecting part 204 extract tiles and the sending part 205 acquires packets corresponding to the tiles.

Also, the extracting part 202 may extract codes corresponding to a tile. In FIG. 19, processes that are the same as the ones in FIG. 10 are indicated by the same reference numerals and the explanation thereof will be omitted.

In step S401, the extracting part 202 calculates a resolution based on information received from the receiving part 201. A method for calculating the resolution will be described later with reference to FIG. 21.

In step S402, the extracting part 202 reads out a tile size from an image header in codes stored in the storing part 203. Then, the extracting part 202 selects and extracts tiles including the display area from roff and rsize acquired from the receiving part 201, regarding all resolutions lower than the calculated resolution.

When the determination result of the step S104 is YES, this extracting process advances to step S403, and the selecting part 204 extracts tiles adjacent to the tile extracted in the step S402. When the determination result of the step S104 is NO, the selecting part 204 does not add the adjacent tiles.

It should be noted that the adjacent tiles include not only tiles adjacent to an upper edge, a lower edge, a right edge, and a left edge of the tile extracted by the extracting part 202 but also tiles sharing an upper right apex, an upper left apex, a lower right apex, and a lower left apex of the tile extracted by the extracting part 202.

By advancing to step S404 following the step S403, the selecting part 204 discards entropy codes of tiles other than the tile extracted by the extracting part 202 and the selecting part 204.

Figure 20:
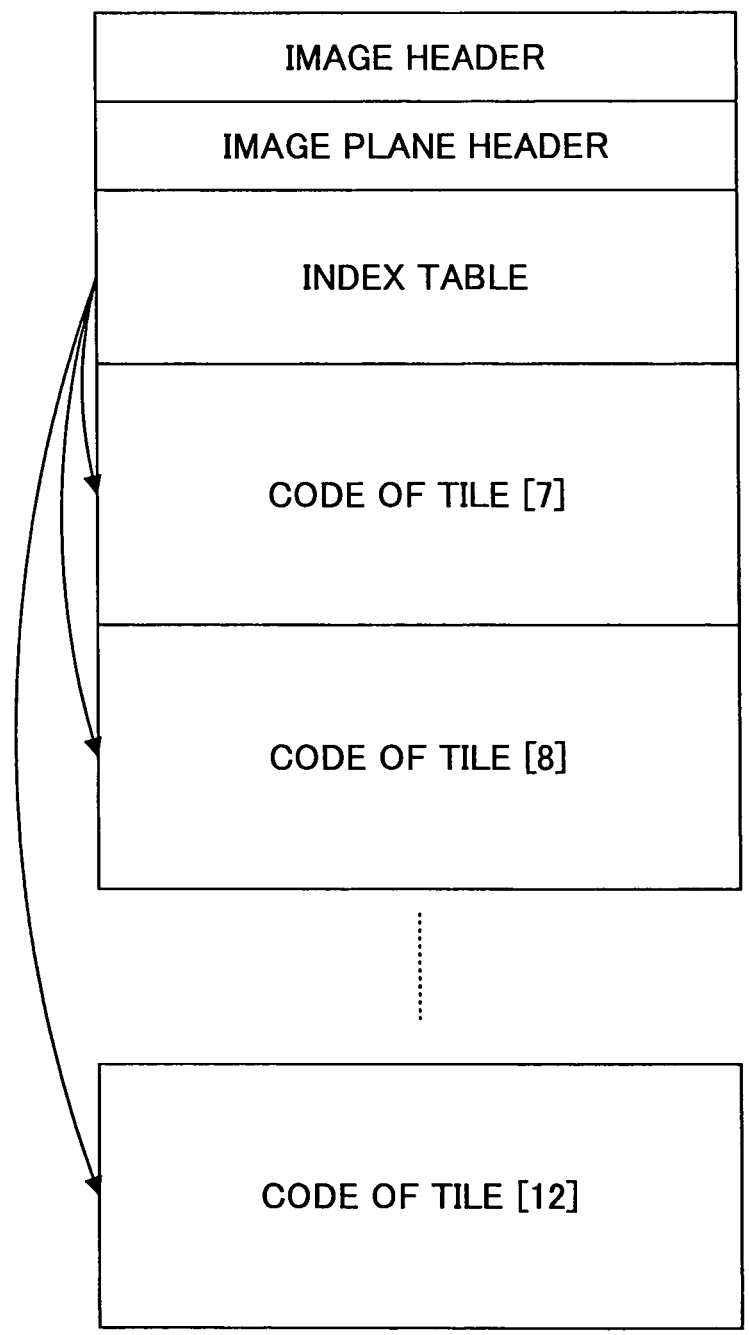
FIG. 20 is a diagram illustrating an example of re-writing an index table.

By advancing to step S405 following the step S404, the selecting part 204 re-writes an index table for codes of the selected tiles. FIG. 20 is a diagram illustrating an example of re-writing the index table. As illustrated in FIG. 20, if only $7^{th}$ through $12^{th}$ tiles are required, only entropy codes for these tiles remain, and the index table is modified to indicate the entropy codes in sequence. By these processes, a necessary portion of codes to display without an entropy decoding from original codes is generated.

By advancing to step S406 following the step S405, the sending part 205 sends the generated portion of the codes to the client PC 104.

<Process for Calculating Resolution>

Figure 21:
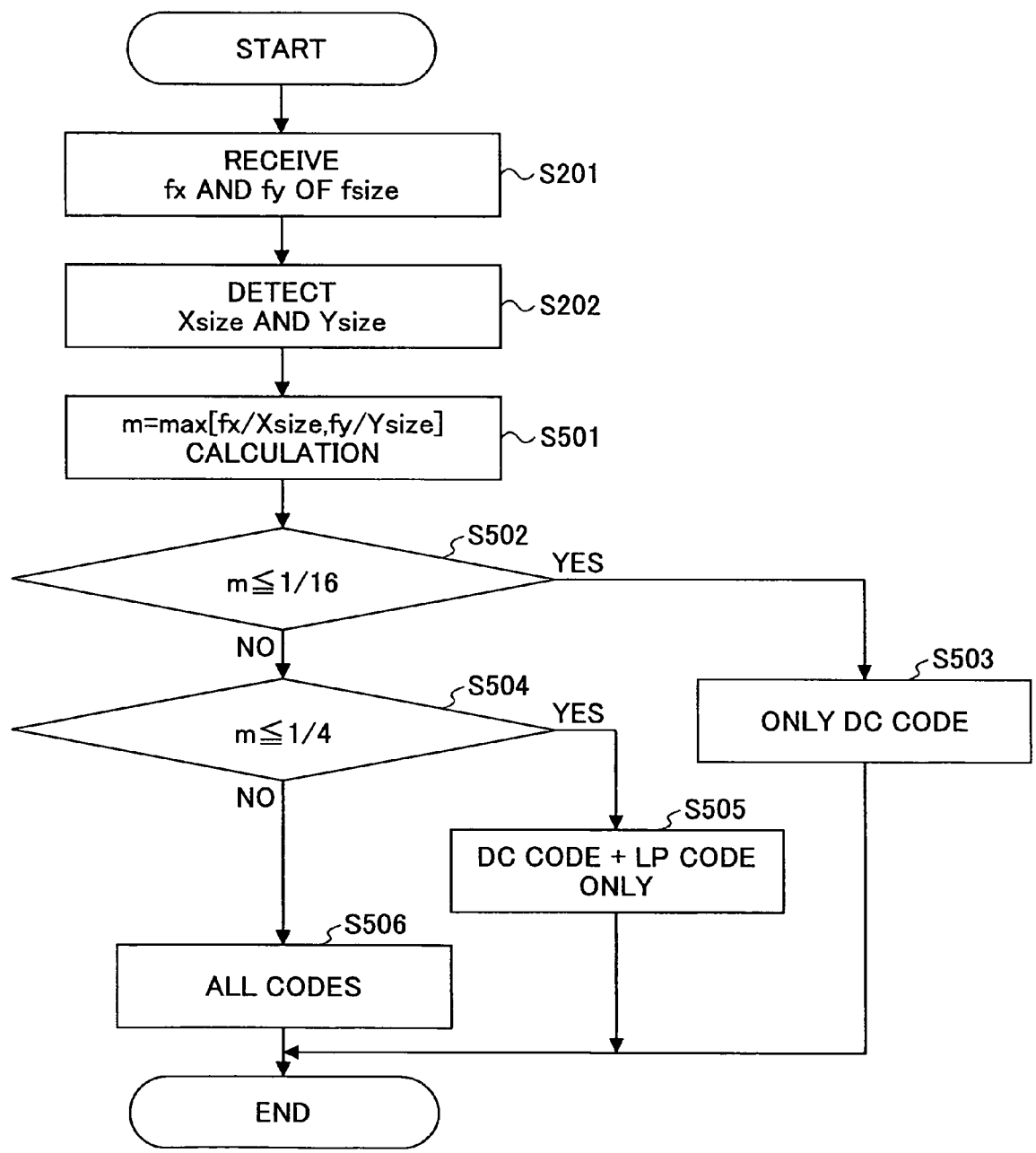
FIG. 21 is a flowchart for explaining a process for calculating a resolution.

A process for calculating a resolution conducted by the extracting part 202 in the step S401 will be described. FIG. 21 is a flowchart for explaining the process for calculating a resolution. In FIG. 21, processes that are the same as the ones in FIG. 11 are indicated by the same reference numerals and the explanation thereof will be omitted.

By advancing to step S501 following the step S202, a value of m used for a resolution determination is calculated. m used for a resolution determination is acquired by the following expression:

$$m = \max[fx/X\text{size}, fy/Y\text{size}] \qquad (35).$$

By advancing to step S502 following the step S501, it is determined whether or not m is less than or equal to $\frac{1}{16}$. When a determination result in the step S502 is YES, this process advances to the step S503, and it is determined that a necessary resolution is the DC code alone.

When the determination result in the step S502 is NO, this process advances to step S504, and it is determined that m is less than or equal to $\frac{1}{4}$. When a determination result in the step S504 is YES, this process advances to step S505, and it is determined that the necessary resolution is only the DC code and the LP code.

When the determination result in the step S504 is NO, this process advances to step S506, and it is determined that the necessary resolution is all codes (including the DC code, the LP codes, the HP codes, and Flexbits). By the above processes, it is possible to acquire the necessary resolution.

As described above, in the information processing apparatus 100 according to the second embodiment, it is possible to extract codes corresponding to the predetermined image area by depending on whether or not an adequate post-filter process is conducted. That is, with respect to the codes encoded by the JPEG-XR scheme, at the side of the information processing apparatus 100, it is possible to prioritize the image quality by including the adjacent tiles or to prioritize reducing of traffic by excluding the adjacent tiles.

Moreover, at the side of the client PC 104, it is possible to determine whether or not to prioritize the image quality or reducing of traffic. By receiving a signal indicating contents determined by the client PC 104, it is possible for the information processing apparatus 100 to select either one of the image quality and the reducing of traffic in response to a request from the client PC 104.

Furthermore, by defining codes influencing an encoding of codes of a tile as codes of tiles contacting the tile in the horizontal direction or in the vertical direction, it is possible to easily conduct a code extraction when selecting the image quality at the boundary of the display area.

In addition, process contents in the first embodiment and the second embodiment can be recorded as a program in a recording medium. That is, the program recorded in the recording medium is loaded to a computer and the computer functions as the above described information processing apparatus 100 by executing the program. Moreover, in the information processing apparatus 100 according to the present invention, the client PC 104 is not always necessary. The information processing apparatus 100 itself may indicate a predetermined area, and extract, decode, and display the codes corresponding to the predetermined area from codes stored in the apparatus itself.

The present invention is not limited to the specifically disclosed embodiments, and variations and modifications may be made without departing from the scope of the invention.

The present application is based on the Japanese Priority Patent Application No. 2008-128850 filed May 15, 2008, the entire contents of which are hereby incorporated by reference.

What is claimed is:

1. An information processing apparatus comprising:
   an encoder configured to encode an image to generate an encoded image;
   a receiver configured to receive a portion of the encoded image as an image area;
   an extractor configured to,
      define one or more divisions corresponding to the image area received by the receiver as a first division group,
      extract first codes of the first division group, and
      extract second codes of second divisions of the image area, the second codes influencing decoding of the first codes, if extraction of the second codes is not suppressed; and
   a selector configured to suppress extraction of the second codes in response to a selection indicating not to extract the second codes.

2. The information processing apparatus as claimed in claim 1, wherein,
   said receiver is configured to receive a signal indicating whether or not to extract the second codes, and
   said selector is configured to suppress extraction of the second codes based on the signal received by the receiver.

3. The information processing apparatus as claimed in claim 1, wherein the second divisions influencing the decoding of the code of the first division group are adjacent to the first division group.

4. The information processing apparatus of claim 1, wherein the selector is configured to suppress extraction of the second codes, if an image quality has a low priority.

5. An information processing apparatus comprising:
   an encoder configured to encode an image to generate an encoded image;
   a receiver configured to receive a portion of the encoded image as an image area;
   an extractor configured to,
      define one or more divisions corresponding to the image area received by the receiver as a first rectangular area group,
      extract first codes of the first rectangular area group, and extract second codes of second rectangular areas of the image area, the second codes influencing decoding of the first codes, if extraction of the second codes is not suppressed; and a selector configured to suppress extraction of the second codes in response to a selection indicating not to extract the second codes.

6. The information processing apparatus as claimed in claim 5, wherein, said receiver is configured to receive a signal indicating whether or not to extract the second codes, and said selector is configured to suppress extraction of the second codes, based on the signal received by the receiver.

7. The information processing apparatus as claimed in claim 5, wherein the second rectangular areas are adjacent to the first rectangular area group.

8. An information processing method comprising:

encoding an image to generate an encoded image;

receiving a portion of the encoded image as an image area;

extracting first codes of a first division group corresponding to the image area; and extracting second codes of second divisions of the image area influencing decoding of the first codes in response to a selection indicating to extract the second codes.

* * * * *